(12) United States Patent
Andersson et al.

(10) Patent No.: US 10,844,800 B2
(45) Date of Patent: Nov. 24, 2020

(54) ENGINE KILL SWITCH AND CONTROL ASSEMBLY

(71) Applicant: Walbro LLC, Tucson, AZ (US)

(72) Inventors: Martin N. Andersson, Caro, MI (US); Cyrus M. Healy, Ubly, MI (US); Gerald J. LaMarr, Jr., Bay City, MI (US); George M. Pattullo, Caro, MI (US)

(73) Assignee: Walbro LLC, Tucson, AZ (US)

( * ) Notice: Subject to any disclaimer, the term of this patent is extended or adjusted under 35 U.S.C. 154(b) by 46 days.

(21) Appl. No.: 16/072,309

(22) PCT Filed: Jan. 19, 2017

(86) PCT No.: PCT/US2017/014057
§ 371 (c)(1),
(2) Date: Jul. 24, 2018

(87) PCT Pub. No.: WO2017/132043
PCT Pub. Date: Aug. 3, 2017

(65) Prior Publication Data
US 2019/0040810 A1 Feb. 7, 2019

Related U.S. Application Data

(60) Provisional application No. 62/364,348, filed on Jul. 20, 2016, provisional application No. 62/286,691, filed on Jan. 25, 2016.

(51) Int. Cl.
*F02D 41/04* (2006.01)
*F02D 41/26* (2006.01)
(Continued)

(52) U.S. Cl.
CPC .......... *F02D 41/042* (2013.01); *A01D 34/76* (2013.01); *F02D 41/04* (2013.01); *F02D 41/26* (2013.01);
(Continued)

(58) Field of Classification Search
CPC ........ F02D 41/042; F02D 41/04; F02D 41/26; A01D 34/76; A01D 2034/907;
(Continued)

(56) References Cited

U.S. PATENT DOCUMENTS 3,820,070 A * 6/1974 Fox .................. G08C 23/06
398/106
4,074,234 A * 2/1978 Fox .................. B66C 13/40
340/13.36

(Continued)

FOREIGN PATENT DOCUMENTS

| JP | 2005133631 A | 5/2005 |
|---|---|---|
| WO | WO2015179653 A1 | 11/2015 |
| WO | 2017/129246 A1 | 8/2017 |

OTHER PUBLICATIONS

Swedish Search Report in Swedish Patent Application No. 1850911-7 dated May 17, 2019 (4 pages).
Sparkfun—How to build a remote kill switch, created Jul. 18, 2016, accessed from Internet: <https://learn.sparkfun.com/tutorials/how-to-build-a-remote-kill-switch>; whole document.
Written Opinion & International Search Report for PCT/US2017/014057 dated May 2, 2017, 17 pages.

*Primary Examiner* — Hung Q Nguyen
*Assistant Examiner* — Susan E Scharpf
(74) *Attorney, Agent, or Firm* — Reising Ethington P.C.

(57) ABSTRACT

A kill switch assembly for an internal combustion engine may include a housing, a first terminal carried by the housing and connected to a ground wire, a second terminal carried by the housing and connected to an engine microcontroller communication wire, and a kill switch. The kill switch may be carried by the housing, electrically connected to the first and second terminals, and manually operable by (Continued)

an operator to change the state of the electric switch to provide an engine stop signal to the engine microcontroller. The assembly may also include an electronic circuit carried by the housing, connected to the first and second terminals, and through the wires communicating with the engine microcontroller.

18 Claims, 12 Drawing Sheets

(51) Int. Cl.
*F02N 11/08* (2006.01)
*F02P 1/08* (2006.01)
*F02P 5/15* (2006.01)
*F02P 9/00* (2006.01)
*H01H 23/16* (2006.01)
*A01D 34/76* (2006.01)
*A01D 34/90* (2006.01)

(52) U.S. Cl.
CPC .............. *F02N 11/08* (2013.01); *F02P 1/086* (2013.01); *F02P 5/1502* (2013.01); *F02P 9/002* (2013.01); *H01H 23/16* (2013.01); *A01D 2034/907* (2013.01); *H01H 2300/028* (2013.01)

(58) Field of Classification Search
CPC ......... F02N 11/08; F02P 1/086; F02P 5/1502; F02P 9/002; H01H 23/16; H01H 2300/028
See application file for complete search history.

(56) References Cited

U.S. PATENT DOCUMENTS

| | | | |
|---|---|---|---|
| 4,949,684 A * | 8/1990 | Gohara | F02N 11/105 123/179.3 |
| 4,996,464 A * | 2/1991 | Dodd | H05B 41/042 315/289 |
| 5,345,903 A * | 9/1994 | Motose | F02D 7/02 123/198 D |
| 5,381,128 A * | 1/1995 | Kaplan | B60R 25/1003 180/287 |
| 5,422,632 A * | 6/1995 | Bucholtz | B60R 25/04 307/10.3 |
| 7,204,221 B2 * | 4/2007 | Iida | F01M 11/12 123/179.2 |
| 7,448,358 B2 | 11/2008 | Andersson et al. | |
| 7,546,836 B2 * | 6/2009 | Andersson | F02P 3/0815 123/406.56 |
| 2005/0093369 A1 * | 5/2005 | Iida | F01M 11/12 307/10.1 |
| 2006/0069495 A1 * | 3/2006 | Andersson | F02D 41/042 701/112 |
| 2008/0004777 A1 * | 1/2008 | Quigley | B65F 3/00 701/50 |
| 2011/0023825 A1 | 2/2011 | Lei et al. | |
| 2014/0028332 A1 | 1/2014 | Praeger et al. | |
| 2016/0003210 A1 | 1/2016 | Andersson et al. | |
| 2016/0356255 A1 * | 12/2016 | Albinger | F02D 41/222 |
| 2017/0058810 A1 * | 3/2017 | Andersson | F02P 1/086 |

* cited by examiner

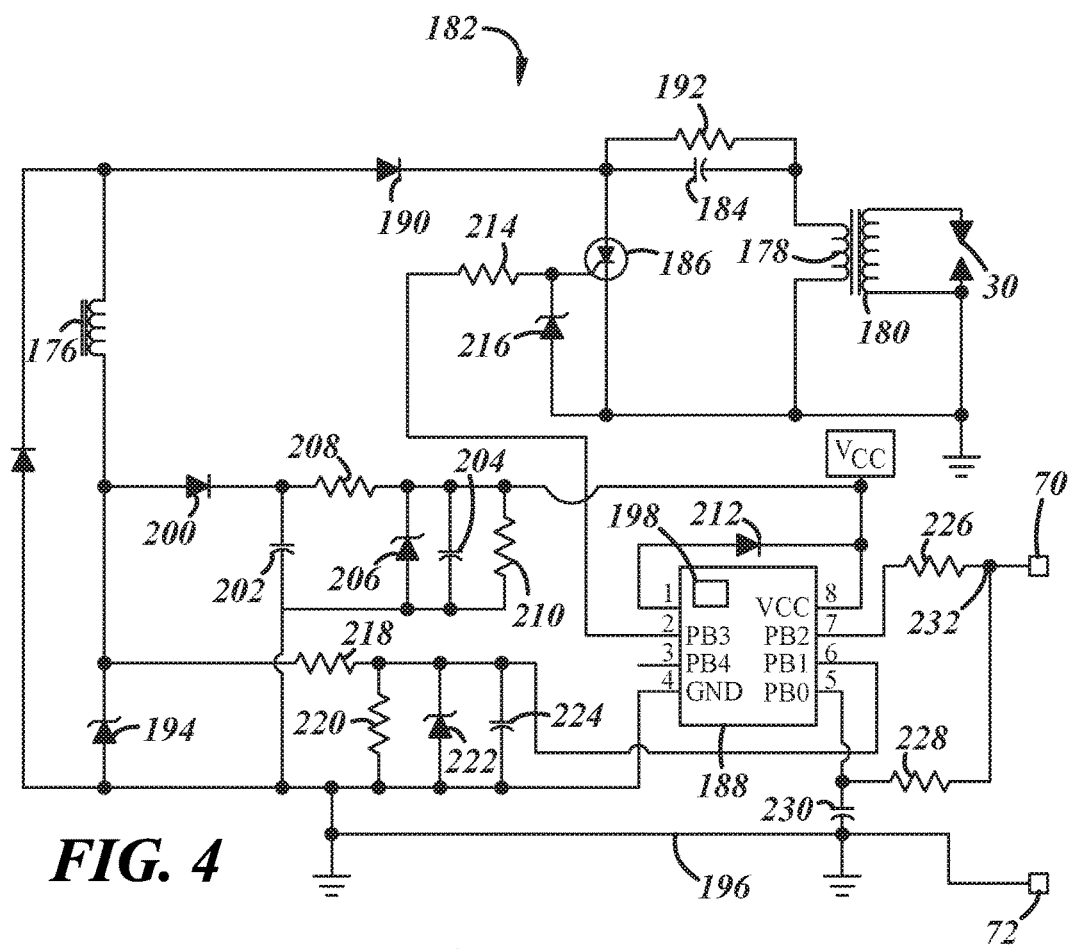
FIG. 4
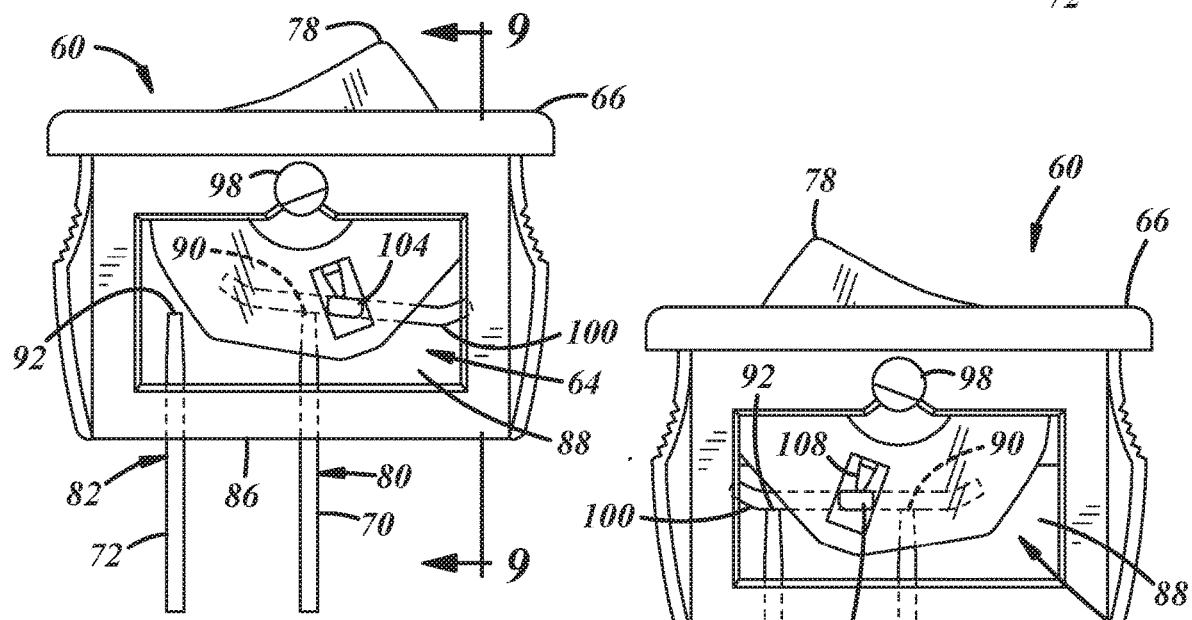
FIG. 5
FIG. 6

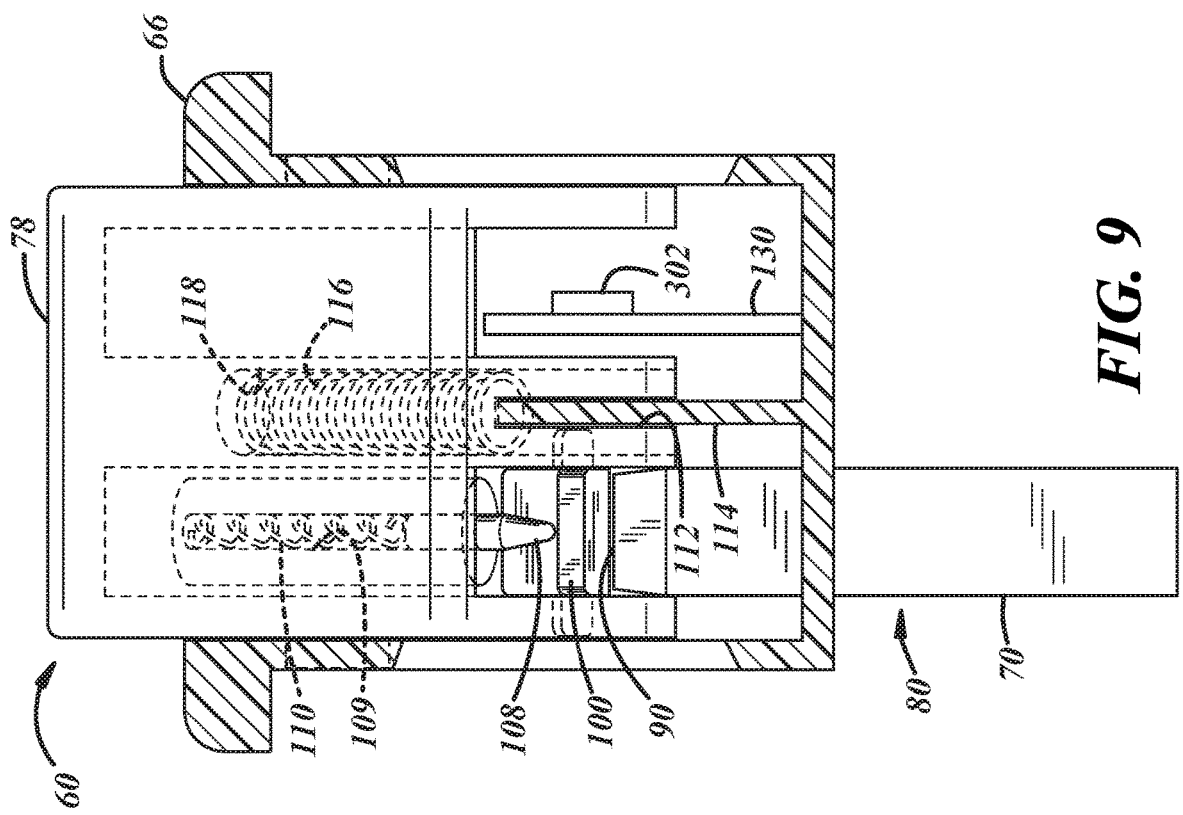
FIG. 9
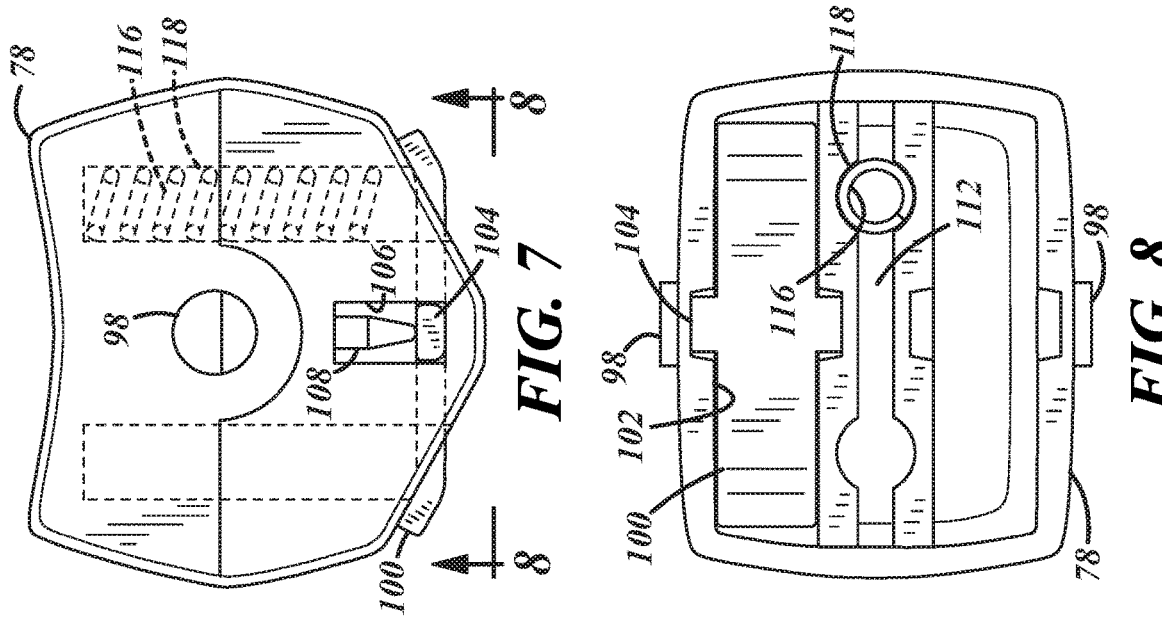
FIG. 7
FIG. 8

ENGINE KILL SWITCH AND CONTROL ASSEMBLY

REFERENCE TO RELATED APPLICATIONS

This application claims the benefit of U.S. Provisional Patent Application Ser. No. 62/364,348, filed on Jul. 20, 2016, and the benefit U.S. Provisional Patent Application Ser. No. 62/286,691, filed on Jan. 25, 2016, which are incorporated herein by reference in their entirety.

TECHNICAL FIELD

The present disclosure relates generally to internal combustion engines and more particularly to control systems for such engines.

BACKGROUND

Small or utility internal combustion engines are used to power a wide variety of various products such as electric generators, air compressors, water pumps, power washers, lawn and garden equipment such as garden tractors, tillers, chain saws, leaf blowers, lawn mowers, lawn edgers, grass and weed trimmers, and the like. Many of these engines are single cylinder two-stroke or four-stroke and gasoline powered with a spark plug and an ignition control module connected by two wires to the terminals of an engine stop or kill switch. The kill switch is manually operable by an operator to terminate supplying an electric current to the spark plug and thus stopping operation of a running engine. Typically these products do not have a separate battery for supplying an electric current to the spark plug and instead utilize a magneto system with magnets mounted on a flywheel of the engine to generate electric power for a capacitive discharge ignition system which often includes a microcontroller which typically varies and controls ignition timing of the current at a high potential voltage supplied to the spark plug of the operating engine. Typically these engines are manually cranked for starting by an automatic recoil rope starter.

SUMMARY

In at least some implementations, a kill switch assembly includes an electric switch manually operated by an operator to provide an engine kill or stop signal to the ignition control system of an operating engine and circuitry for performing at least one additional function such as receiving engine performance data from its microcontroller to be stored in a kill switch microcontroller, sending data to or receiving data from a computer, sending temperature information to the engine microcontroller, receiving a signal from the engine microcontroller to provide a visually observable signal to the product operator, receiving a signal from an external control circuitry for sending a signal to the engine microcontroller to initiate a routine or process programmed therein, and the like.

In at least some implementations, a kill switch assembly for an internal combustion engine with an engine microcontroller includes a housing, a first terminal carried by the housing and configured for connection to a ground, a second terminal carried by the housing and configured for connection to an engine microcontroller, and an electric kill switch carried by the housing, electrically connected to the first and second terminals, and manually operable by an operator to change the state of the electric switch to provide an engine stop signal to the engine microcontroller. The assembly may also include an electronic circuit carried by the housing, connected to the first and second terminals, and communicating with the engine microcontroller. In at least some implementations, the communication may occur wirelessly, such as via bluetooth protocol.

A speed regulating circuit in communication with an ignition circuit having a primary coil coupled to an ignition member to cause an ignition event within an engine, the speed regulating circuit being arranged to selectively prevent energy from the primary coil from being discharged to the ignition member to selectively prevent an ignition event. In at least some implementations, the speed regulating circuit includes a bidirectional or bilateral triode thyristor having an anode coupled to the primary coil and an anode coupled to ground, and an input gate that may be selectively actuated so that energy received at the triode thyristor from the primary coil PRI is routed to ground thereby inhibiting or preventing transfer of energy from the primary coil to the ignition member. In at least some implementations, the input gate may be coupled to a microcontroller that selectively actuate the triode thyristor as a function of engine speed, for example, an engine speed above a threshold speed.

BRIEF DESCRIPTION OF THE DRAWINGS

The following detailed description of certain embodiments and best mode will be set forth with reference to the accompanying drawings, in which:

FIG. 4 is a schematic diagram of electronic circuitry of the engine control module;

FIG. 5 is an enlarged sectional side view of the kill switch assembly with its switch in its open position;

FIG. 6 is an enlarged sectional side view of the kill switch assembly with its switch in its closed position;

FIG. 7 is an enlarged side view of a rocker button of the kill switch assembly;

FIG. 8 is an enlarged bottom view of the rocker button taken on line 8-8 of FIG. 7;

FIG. 9 is a sectional view taken on line 9-9 of FIG. 5;

DETAILED DESCRIPTION

Figure 1:
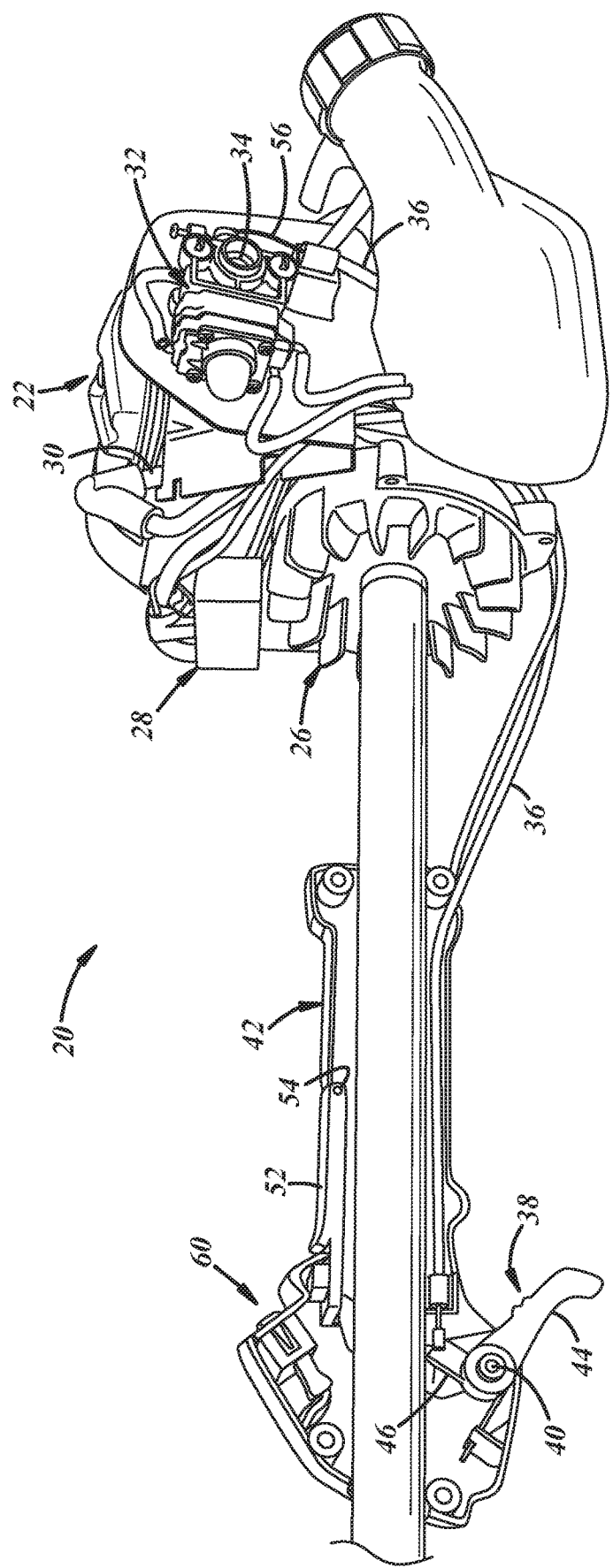
FIG. 1 is a fragmentary perspective view of a grass and weed trimmer with an engine kill switch assembly embodying the invention and with some of the trimmer housing removed.
Figure 2:
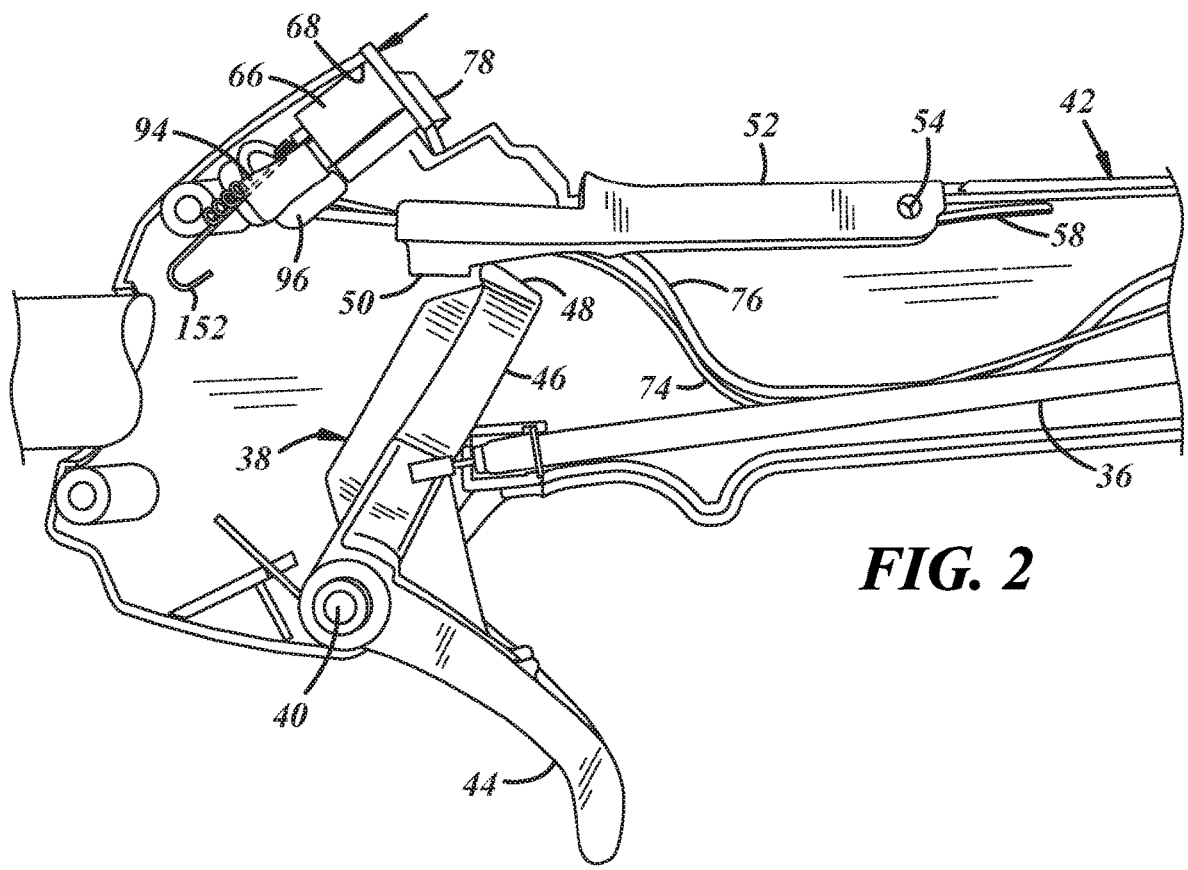
FIG. 2 is an enlarged fragmentary perspective view of a portion of the trimmer housing carrying a kill switch assembly embodying the invention.

FIGS. 1 and 2 illustrate a handheld power tool or product in the form of a grass and weed string trimmer 20 powered by a small or light duty internal combustion engine 22. Typically, this engine is a single cylinder two-stroke or four-stroke gasoline powered internal combustion engine. In this engine, a single piston is slidably received for reciprocation in a cylinder and connected by a tie rod to a crankshaft 24 attached to a flywheel 26. Typically, this engine has a capacitive discharge ignition system (CDI) module 28 for supplying a high voltage ignition pulse to a spark plug 30 for igniting an air-fuel mixture in the engine cylinder combustion chamber. This module 28 varies and controls the ignition timing relative to the top dead center position of the piston in response to changing engine operating conditions.

Typically, this engine does not have any battery supplying an electric current to the spark plug or powering the control module 28 which typically includes a microcontroller. Typically, this engine is manually cranked for starting with an automatic recoil rope starter.

The term "light-duty combustion engine" broadly includes all types of non-automotive combustion engines including two and four-stroke gasoline powered engines used in various products including portable electric generators, air compressors, water pumps, power washers, snow blowers, personal watercraft, boats, snowmobiles, motorcycles, all terrain vehicles, lawn and garden equipment such as garden tractors, tillers, chainsaws, edgers, grass and weed trimmers, air blowers, leaf blowers, etc.

As shown in FIGS. 1 and 2, the engine has a carburetor 32 having a throttle valve 34, typically a rotary barrel or butterfly valve, connected by a Bowden wire 36 to a manually operable throttle lever 38 pivotally mounted 40 in a handle housing 42 of the trimmer. The throttle lever has a manually engageable trigger 44 extending outwardly of the handle housing and an arm 46 extending generally radially relative to the pivot 40 and preferably at about a right angle to the trigger 44. At its distal end, this arm has a generally axially extending dog 48 releasably engageable with a stop 50 on a safety release latch 52 pivotally mounted adjacent its other end in the handle housing on a pivot axis 54 preferably parallel to the pivot axis 40 of the throttle lever 38. The safety latch 52 retains the throttle lever 38 in its idle position (FIG. 3) until the safety latch is manually depressed to disengage its stop 50 from the dog 48 to thereby permit manually moving the trigger 44 and thus the throttle lever 38 from its idle position toward and to its wide open throttle (WOT) position to move the wire 56 of the flexible Bowden cable assembly 36 to move the carburetor throttle valve 34 from its idle position toward and to its wide open position. The safety latch 38 is yieldably biased to its latched position by a leaf spring 58.

Figure 3:
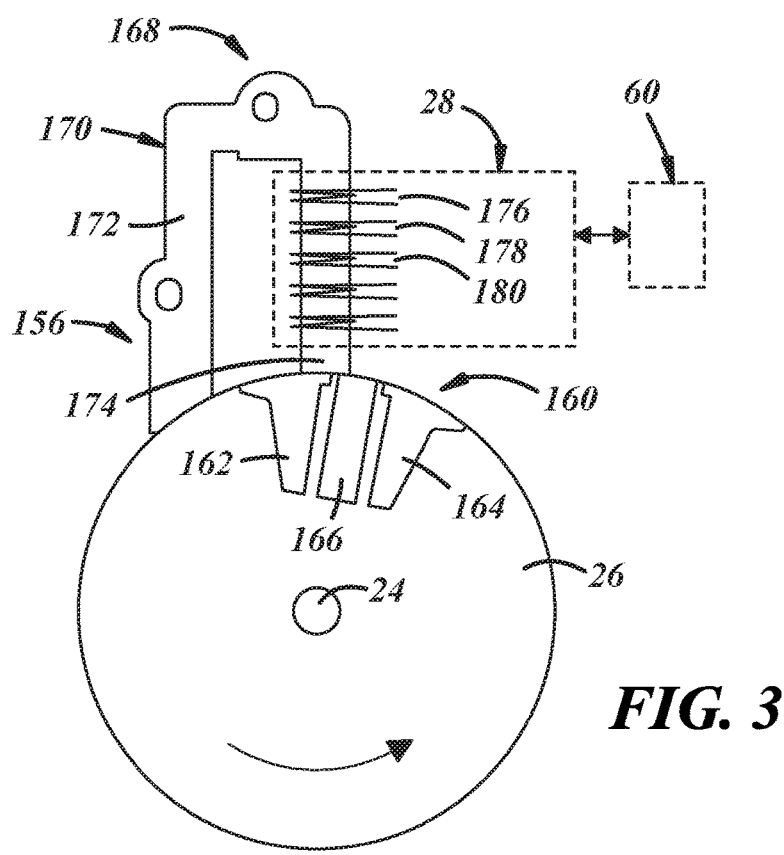
FIG. 3 is a schematic diagram illustrating a capacitor discharge ignition system and control module of an engine.

FIG. 3 schematically illustrates a magneto system 156, the control module 28 and a kill switch assembly 60 of the trimmer 20. The kill switch assembly 60 has a kill switch 64 (FIGS. 5-9) and circuitry discussed in detail here after. This magneto system includes a permanent magnet element 160 with pole shoes 162, 164 and a permanent magnet 166 mounted on the flywheel 26 such that when rotating it induces a magnetic flux in a nearby stator assembly 168 of the module 28 as the magnet element passes thereby.

The stator assembly 168 may include a lamstack 170 having a first leg 172 and a second leg 174 (separated from the rotating flywheel by a relatively small and measured air gap which may be about 0.3 mm), a charge coil winding 176, an ignition primary coil winding 178 and a secondary coil winding 180 which may all be wrapped around a single leg of the lamstack. The lamstack 170 may be a generally U-shaped ferrous armature made from a stack of iron plates and may be in a module housing located on the engine. The ignition primary and secondary coil windings 178, 180 may provide a step-up transformer and as is well known by those skilled in the art, the primary winding 178 may have a comparatively few turns of a relatively heavy gauge wire, while the secondary ignition coil winding 180 may have many turns of a relatively fine wire. The ratio of turns between the primary and secondary ignition windings generates a high voltage potential in the secondary winding that is used to fire the spark plug 30 of the engine 22 to provide an electric arc or spark and consequently ignite an air-fuel mixture in the engine combustion chamber.

As shown in FIG. 4, the power charge coil 176 and the ignition primary and secondary coils 178, 180 are coupled to an ignition and control circuit 182 of the control module 28. The term "coupled" broadly encompasses all ways in which two or more electrical components, devices, circuits, etc. can be in electrical communication with one another; this includes, but is not limited to, a direct electrical connection and a connection via an intermediate component, device, circuit, etc. This circuit 182 includes an energy storage and ignition discharge capacitor 184, an electronic ignition switch 186 preferably in the form of a thyristor, such as a silicon controlled rectifier (SCR), and a microcontroller 188. One end of the power charge coil 176 is connected through a diode 190 to the ignition capacitor 184. A resistor 192 may be coupled in parallel with the capacitor. The other end of the coil is connected through a diode 194 to the circuit ground 196. A majority of the energy induced in the power charge winding 176 is supplied to the capacitor 184 which stores this energy until the microcontroller 188 changes the switch 186 to a conductive state to discharge the capacitor 184 through the primary coil 178 of the transformer which induces in the secondary coil 180 a high voltage potential which is applied to the spark plug 30 to provide a combustion initiating arc or spark. More specifically, when the ignition switch 186 is turned "on" (in this case, becomes conductive), the switch 186 provides a discharge path for the energy stored on ignition discharge capacitor 184. This rapid discharge of the ignition capacitor 184 causes a surge in current through the primary ignition coil 178, which in turn, creates a fast-rising electromagnetic field in the primary ignition coil. The fast-rising electromagnetic field induces a high voltage ignition pulse in the secondary ignition coil 180. The high voltage ignition pulse travels to spark plug 30 which, assuming it has the requisite voltage, provide a combustion-initiating arc or spark. Other sparking techniques, including flyback techniques, may be used instead.

The microcontroller 188 may include a memory 198 which can store a look-up table, algorithm and/or code to determine and vary the engine ignition timing relative to top dead center of the piston in the cylinder for various engine operating speeds and conditions. In some applications, the microcontroller 188 may also vary and control the fuel-to-air ratio of the air-and-fuel mixture supplied to the cylinder of the operating engine in response to various engine operating speeds and conditions. Various microcontrollers or microprocessors may be used as is known to those skilled in the art. Suitable commercially available microcontrollers include Atmel ATtiny series and Microchip PIC 12 family. Examples of how microcontrollers can implement ignition timing systems can be found in U.S. Pat. Nos. 7,546,836 and 7,448,358, the disclosures of which are incorporated herein by reference. The memory 198 may be a reprogrammable or flash EEPROM (electrically erasable, programmable read-only memory). In other instances, memory 198 may be external of and coupled to the microcontroller 188. The memory 198 should be construed broadly to include other types of memory such as RAM (random access memory), ROM (read-only memory), EPROM (erasable, programmable read-only memory), or any other suitable non-transitory computer readable medium.

As shown in FIG. 4, the microcontroller 188 includes eight pins. Pin 8 of the microcontroller can be coupled to a voltage source ($V_{CC}$) which supplies the microcontroller with power. To power this microcontroller, the circuit 182 has a diode 200, capacitors 202, 204, a zener diode 206, and resistors 208 and 210 electrically connected in the circuit to the power coil and to pin 8. In this example, pin 1 is a reset pin that is connected through a diode 212 to pin 8. Pin 2 is coupled to the gate of ignition switch 186 via resistor 214, which is wired in the circuit with a zener diode 216, and transmits from the microcontroller 188 an ignition signal which controls the state of the switch 186. When the ignition signal on pin 2 is low, the ignition switch 186 is nonconductive and capacitor 184 is allowed to charge. When the ignition signal is high, the ignition switch 186 is conductive and the ignition capacitor 184 discharges through primary ignition coil 178, thus causing a high-voltage ignition pulse to be induced in secondary ignition coil 180 and applied to the spark plug 30. Thus, the microcontroller can govern the discharge of capacitor 184 by controlling the conductive state of the switch 186.

Pin 3 is a general purpose input or output program port which is not used. Pin 4 is a ground which is connected to the circuit ground.

Pin 6 is a signal input connected to the charge winding 176 via resistors 218 and 220, zener diode 222, and capacitor 224 to receive an electronic signal representative of the position of an engine piston in its combustion chamber usually relative to the top dead center (TDC) position of the piston. This signal can be referred to as a timing signal. The microcontroller 188 can use this timing signal to determine engine speed (RPM), the timing of an ignition pulse relative to the piston(s) TDC position (usually from a look-up table), and whether or not and, if so, when to activate an ignition pulse.

Pin 7 is an output signal pin which is connected to input pin 5 through resistors 226 and 228. So that pin 5 is not affected by noise and radio frequency interference (RFI) produced by the spark plug 30, pin 5 is also connected through a capacitor 230 to the circuit ground 196.

In use, the spade connector terminal 72 of the kill switch 64 is connected to the ground 196 of the circuit. The other connector spade terminal 70 of the kill switch is connected to the junction 232 between the first and second resistors 226 and 228. Preferably the first resistor 226 has a resistance value which is in the range of 2 to 20 kOhms, desirably 2 to 12 kOhms, and preferably 2 to 4 kOhms. Desirably, the second resistor 228 has a resistance value in the range of 2 to 2.5 kOhms and preferably 2.2 kOhms. Preferably, the capacitor 230 has a capacitance of about 1 nanofarad.

When the engine is operating, the microcontroller 188 is powered up to receive a signal through pin 6 from which it determines the engine speed or RPM and the position of the piston normally relative to top dead center. Through pin 3, the microcontroller controls the state of the SCR switch 186 to charge the capacitor 184, and typically uses a look-up table stored in memory 198 to determine ignition timing, and changes the state of the ignition switch 186 to discharge the capacitor to produce a spark or arc in the gap of the spark plug 30 to initiate combustion of the fuel-to-air fuel mixture in the engine cylinder. When the kill switch 64 is open (as shown in FIGS. 4 and 5), the microcontroller 188 produces on pin 5 an alternating signal of zero volts and 5 volts.

Whenever the kill switch 64 is closed, the input at pin 5 is zero volts which the microcontroller interprets as a command to shut down the engine and "turns on" and "holds on" the ignition switch 186 to prevent further high potential voltage pulses being supplied to the spark plug 30 and thus terminating ignition of the fuel mixture in the cylinder until the engine stops or ceases operation.

In accordance with a feature of this invention, a kill switch assembly 60 has a circuit board 62 and an engine kill switch 64 both in the same housing 66. Preferably, housing 66 is mounted in the same location 68 in the handle housing as a conventional engine kill switch. This kill switch assembly 60 has two preferably spade connector terminals 70, 72 one of which is connected to a ground wire 74 and the other is connected to a an engine module communication wire 76 for the purposes of the circuitry of the assembly 60 communicating through these wires with the microcontroller 188 of the engine module 28 and to send another signal to kill or stop the running engine when the operator manually actuates a rocker button 78 of the kill switch 64 to stop operation of the engine. In prior art trimmers and the like, a manually actuated conventional rocker switch only provides a signal to kill or stop the operating engine typically by a control circuit microcontroller discontinuing or stopping the application of the high potential voltage to the spark plug so that it does not ignite any air-fuel mixture in the engine cylinder. The kill switch housing 66 is electrically non-conductive and insulative and may be a plastic housing.

As shown in FIGS. 5 and 6, the switch assembly 60 has a pair of spaced-apart electrically conductive posts 80, 82 fixed in a bottom wall 86 of the switch housing and adjacent one end projecting into a pocket 88 in this housing to provide a pair of spaced-apart contacts 90, 92 and adjacent the other end projecting exteriorly of the housing to provide the pair of spaced-apart terminals 70, 72, such as spade terminals, each of which is connected to a separate one of the wires 74, 76 such as through push-on female spade electrical connectors 94, 96. The manually movable rocker button 78 is pivotally mounted in the housing to pivot or see-saw about its pivots 98. An electrically conductive connector bar 100 is received in a slot 102 through the button and has projecting tabs 104 slidably received in spaced-apart blind slots 106 in the rocker button. The connector bar 100 can see-saw about a pivot pin 108 slidably received in a blind bore 109 (FIG. 11) in the rocker button and yieldably biased by a spring 110 into contact with the connector bar and toward the distal end of the slots and the bottom of the rocker button. As shown in FIGS. 8 and 9, in assembly, a recess 112 in the rocker button is slidably received over a guide rib 114 of the switch housing and yieldably biased to an open position (shown in FIG. 5) in which the connector bar does not engage at least one or both of the contacts 90, 92 and thus the kill switch 64 is in an open condition. The kill switch is biased to its open position by a spring 116 received in a blind pocket 118 in the rocker button and bearing on a portion of the guide rib 114. When the portion of the rocker button projecting outwardly from the housing is manually depressed, the button pivots clockwise from a first position (FIG. 5) to a second position (FIG. 6) which moves the connector bar 100 into engagement with both of the contacts 90, 92 to close the switch for as long as the rocker button is manually depressed and when released the spring 116 returns the rocker button to the first position in which the connector bar is disengaged from at least one of the contacts to open the switch as shown in FIG. 5.

As shown in FIG. 9 the kill switch assembly 60 has a circuit board 130 carried by and preferably within the housing 66 which contains electronic circuitry connected to the terminals 70 and 72. The configuration of this circuitry may vary depending on the function it performs. Suitable circuits for performing various different functions are described hereinafter and as will be apparent to one of ordinary skill in the art these circuits have many of the same components many of which are arranged in the same configuration in most of these circuits. In these various circuits the same component has the same reference number and will be described in detail only once and its disclosure will not be repeated and is incorporated by reference in the disclosure and description of the other circuits to avoid unnecessary repetition.

Figure 10:
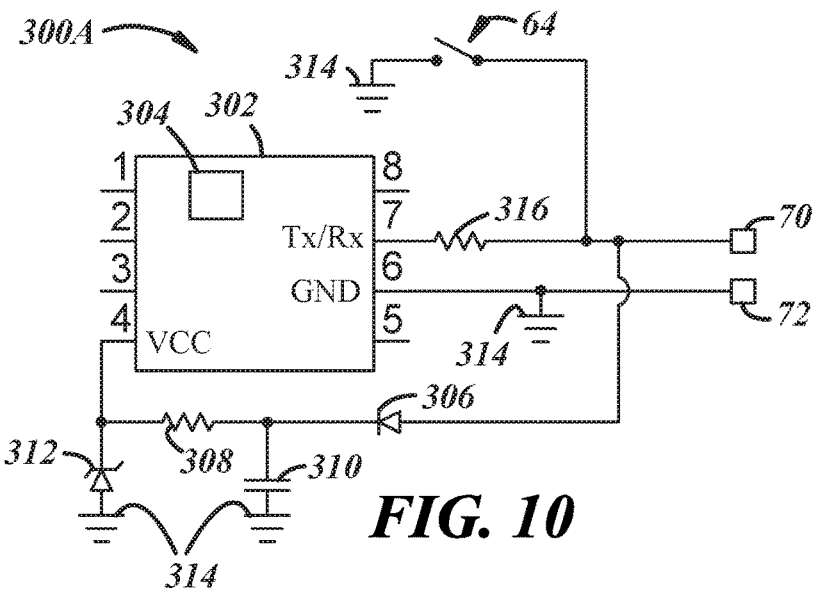
FIG. 10 is a schematic diagram of circuitry with a microcontroller of the kill switch assembly.

FIG. 10 illustrates a circuit 300A which may receive current and/or historical performance data via terminal 70 and wire 74 from the engine microcontroller 188 and its memory 198. This circuit 300A has a microcontroller 302 with 8 pins and a memory 304 in which data may be stored and from which data may be retrieved. While the engine is running the microcontroller 302 is powered by the engine module 28 through a diode 306 and resistor 308 connected to pin 4 of the microcontroller 302 and terminal 70. A capacitor 310 and a zener diode 312 connected across the resistor 306 and to the circuit ground 314 filter out the circuit noise and limit the voltage applied to pin 4. Pin 7 is connected by a resistor 316 to terminal 7 and terminal 70 to transmit data to and receive data from the engine microcontroller 188 through wire 74. The kill switch 64 is connected to terminal 70 and through the ground 314 to terminal 72. The microcontroller ground pin 6 is connected to ground 314 and through terminal 72 and wire 76 to the ground 196 of the engine control circuit 182.

Figure 11:
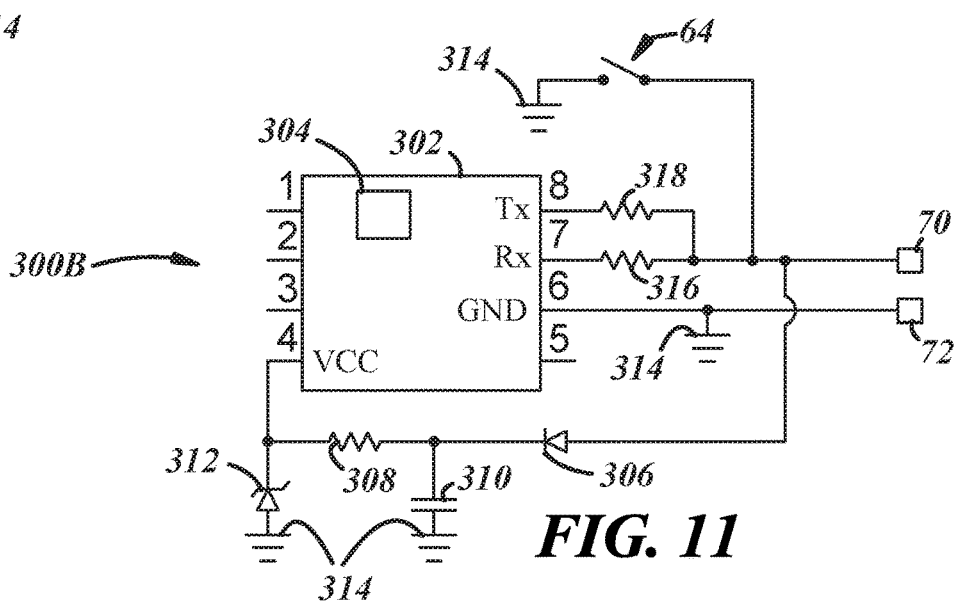
FIG. 11 is a schematic diagram of circuitry with a modification of the circuitry of FIG. 10.

FIG. 11 illustrates a modified circuit 300B which is the same as the circuit 300A except that the pin 8 of the microcontroller is connected by a resistor 318 to terminal 70 to thereby use pin 8 to transmit data from the microcontroller 302 and its memory and to the engine microcontroller 188 and its memory and to use pin 7 to receive data from it.

Figure 12:
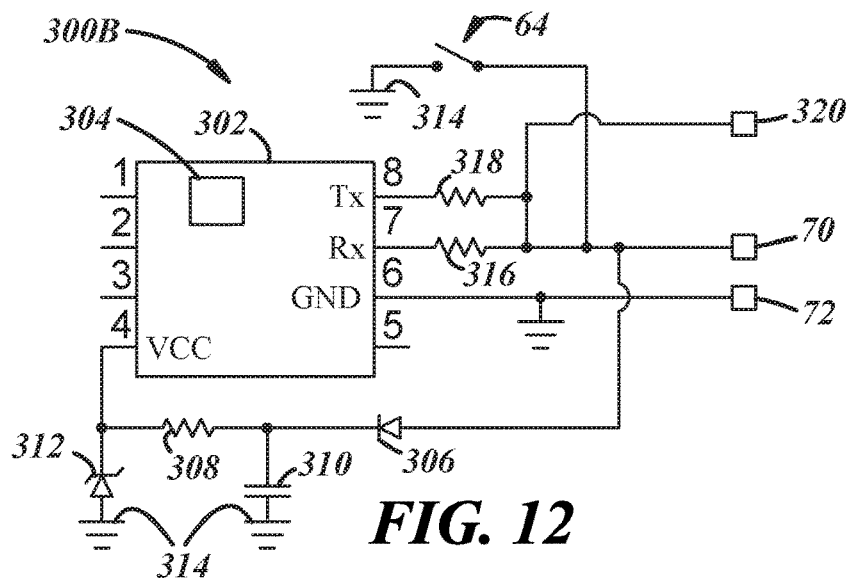
FIG. 12 is a schematic diagram of a modification of the circuitry of FIG. 10 providing a data terminal of the kill switch assembly.

FIG. 12 illustrates a circuit 300C which is the same as the circuit 300B except that pins 7 and 8 of the microcontroller 302 are also connected (respectively through resistors 316 and 318) to a separate data port or terminal 320 for communicating with the engine microcontroller 188 of the module 28. This port 320 can be carried by the housing 60 and be accessible from the exterior of the housing.

Figure 13:
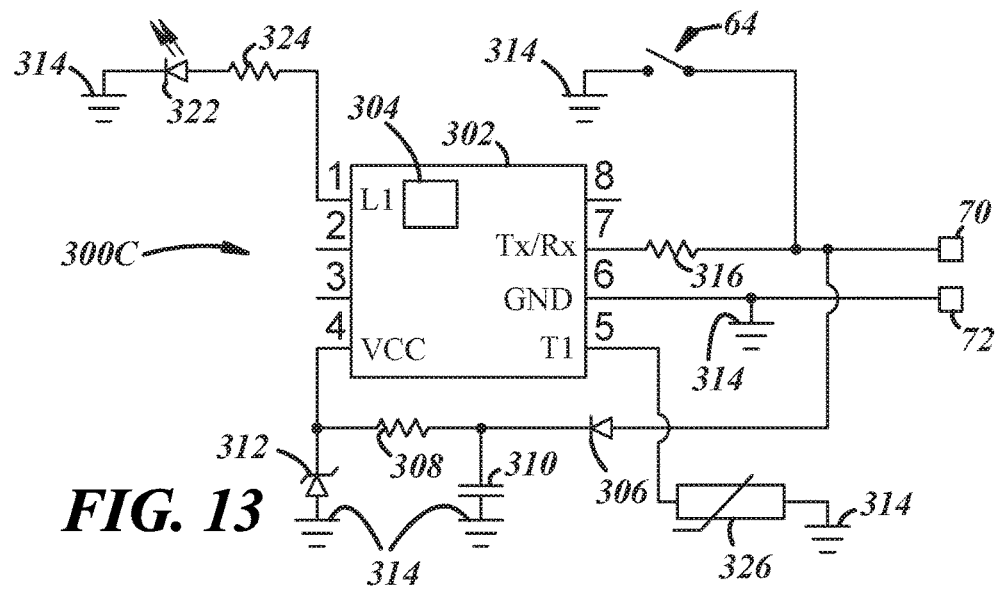
FIG. 13 is a schematic diagram of circuitry adding a signal light and a temperature sensor to the circuitry in FIG. 10 of the kill switch assembly.

FIG. 13 illustrates a circuit 300D which is the same as the circuit 300A with the addition of a light emitting diode 322 connected through a resistor 324 to pin 1 of the microcontroller 302 and a temperature sensor thermistor 326 connected to pin 5 of the microcontroller. The microcontroller 302 can receive a signal from the engine microcontroller 188 of the module 28 to provide the operator with a visual indication of something occurring or that has occurred in either the engine module 28 and/or the operation of the engine. The thermistor 326 can provide to the engine microcontroller 188 of the module 28 an indication of the ambient temperature in which the engine is operating since in at least most products the kill switch assembly 60 is sufficiently distal from the engine that it is not significantly affected by the heat produced by the operating engine and/or the engine exhaust. The light emitting diode 322 and/or the thermistor 326 can be added to any of the circuits of the kill switch assembly 60.

Figure 14:
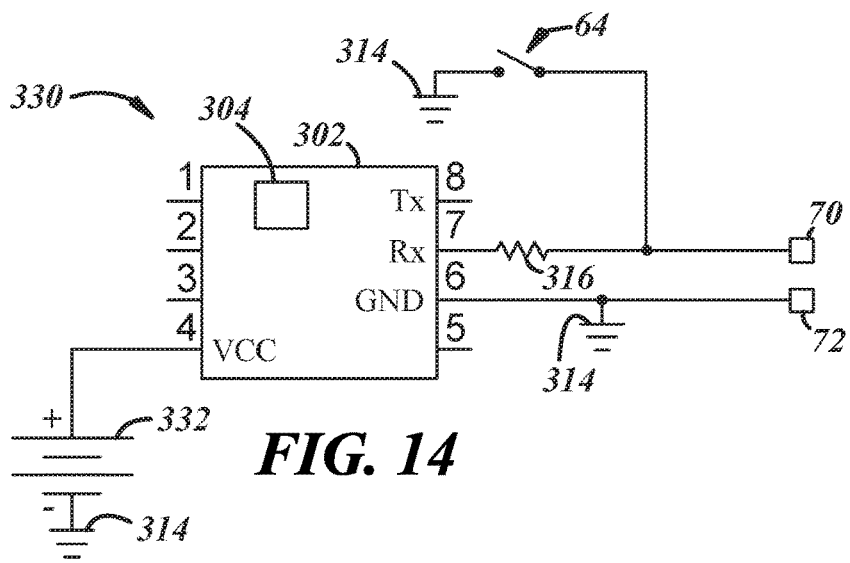
FIG. 14 is a schematic diagram of circuitry powered by a battery of the kill switch assembly.

FIG. 14 illustrates a circuit 330 in which the microcontroller 302 is powered by a battery 332 connected to pin 4 of the microcontroller. The remaining components of the circuitry 330 having the same reference number as those of the circuit 300A and are connected in the same relationship to the microprocessor 302, terminals 70 and 72, and switch 64 as those described in connection with circuit 300A. The battery 332 may be used to power the microcontroller 302 in any of its circuits in lieu of the diode 306, and resistor 308 connected to pin 4, and the capacitor 310 and zener diode 312 connected across the resistor 308.

Figure 15:
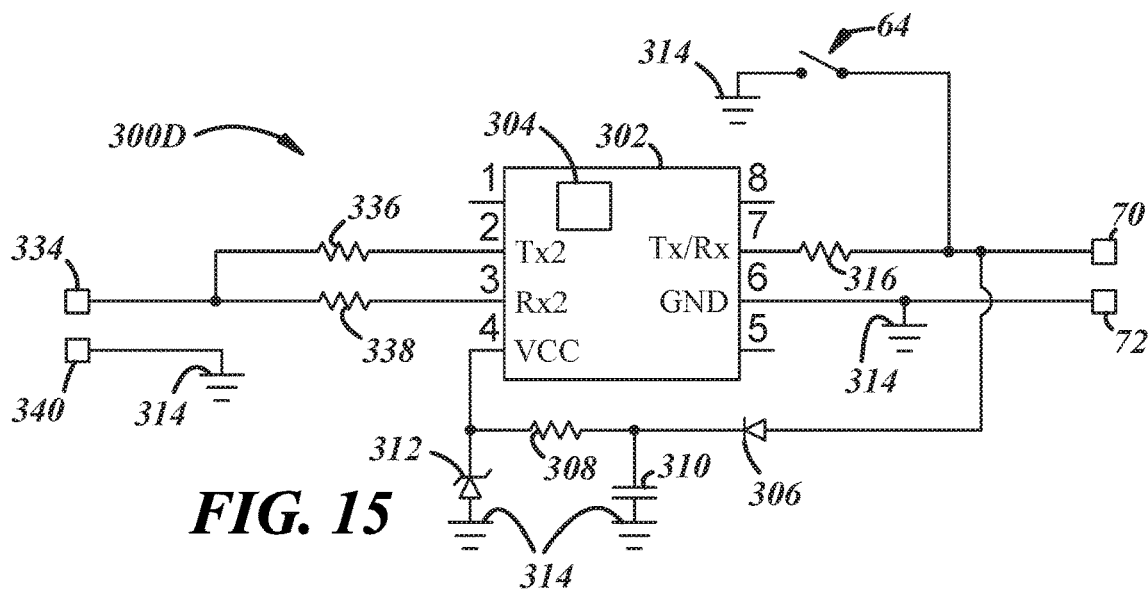
FIG. 15 is a schematic diagram of circuitry with a data communication port or terminal of the kill-switch assembly.

FIG. 15 illustrates a circuit 300D which is the same as the circuit 300A except that a data terminal 334 has been added which is connected through resistors 336 and 338 to pins 2 and 3 respectively of the microcontroller 302 for the purpose of transmitting data to or receiving data from the microcontroller 302 and its memory 304 and/or through the microcontroller 302 transmitting data or a signal to or receiving data or a signal from the engine microcontroller 188 and its memory 198. The port or terminal 334 can be carried by the housing 66 of the kill switch assembly 60 and be accessible from the exposed exterior of the housing.

Figure 16:
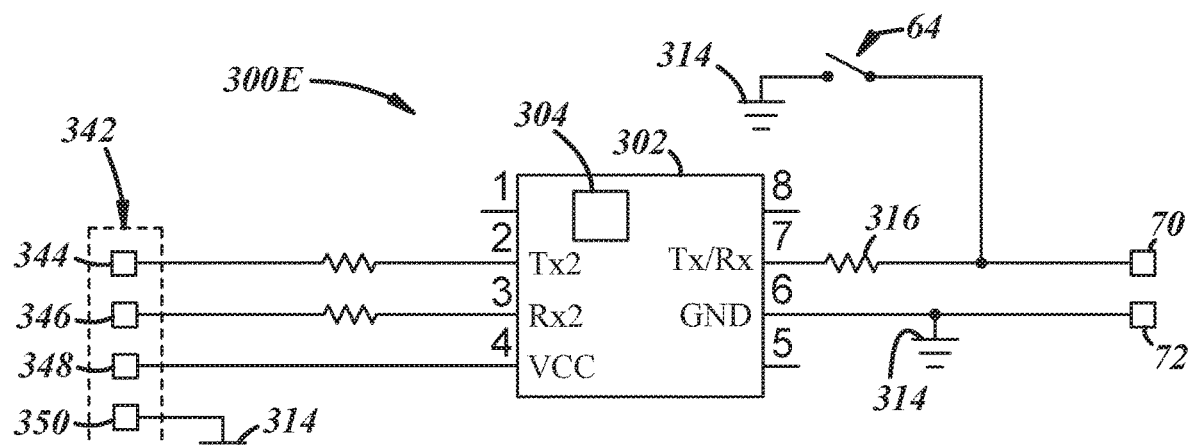
FIG. 16 is a schematic diagram of a modification of the circuitry of FIG. 15 so that a computer can communicate with the microcontroller of the kill switch assembly when the engine is not running.

FIG. 16 illustrates a circuit 300E which may be connected to and powered by a personal computer so that data can be received from the microcontroller 302 and its memory 304 and/or data can be transmitted to the microcontroller 302 and its memory 304 to reprogram them, when the engine is not running. For connecting the computer this circuit has a port 342 with a connector or terminal 344 connected to the micrcontroller transmission pin 2, a terminal 346 connected to data receiving pin 3, a terminal 348 connected to power pin 4, and a terminal 350 connected to the circuit ground 314.

Figure 17:
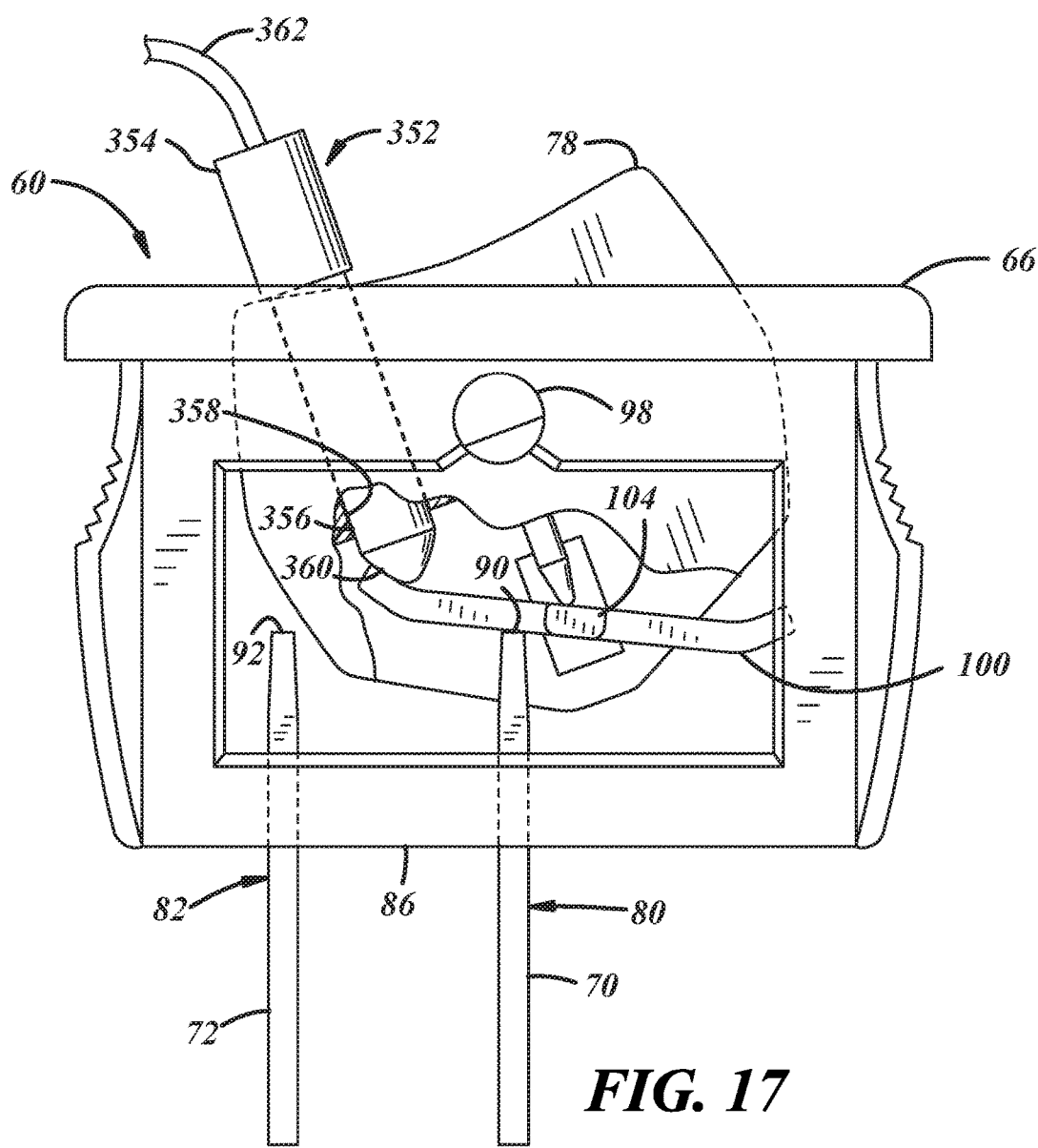
FIG. 17 is a sectional side view of the kill switch assembly illustrating a modification of its rocker button to receive a male connector plug.

FIG. 17 illustrates a modified rocker button 78' that allows an electric connector plug 352 to be directly connected with the terminal 70 through the connector bar 100. The connector plug has a body 354 with a cylindrical shank or pin 356 slidably received in a bore 360 through the rocker button 78'. The connector plug has an electrically conductive tip 360 which bears on and engages the conductor bar 100 and is connected to an electric wire 362 through which signals can be sent and received via the conductor 100, terminal 70 and wire 74 directly to engine microcontroller 188 of the module 28. This connector plug 352 may be used to send a signal from an external control circuit with an electric switch manually operable by an operator to change its state to send a signal to the engine microcontroller 188 to start and execute a process or routine stored in the microcontroller 188 and its memory. An example of one such routine is a process which tests the air-to-fuel ratio of an air-fuel mixture supplied to an operating engine and if need be changes the air-to-fuel ratio to improve engine performance and/or to meet exhaust emission requirements.

Figure 18:
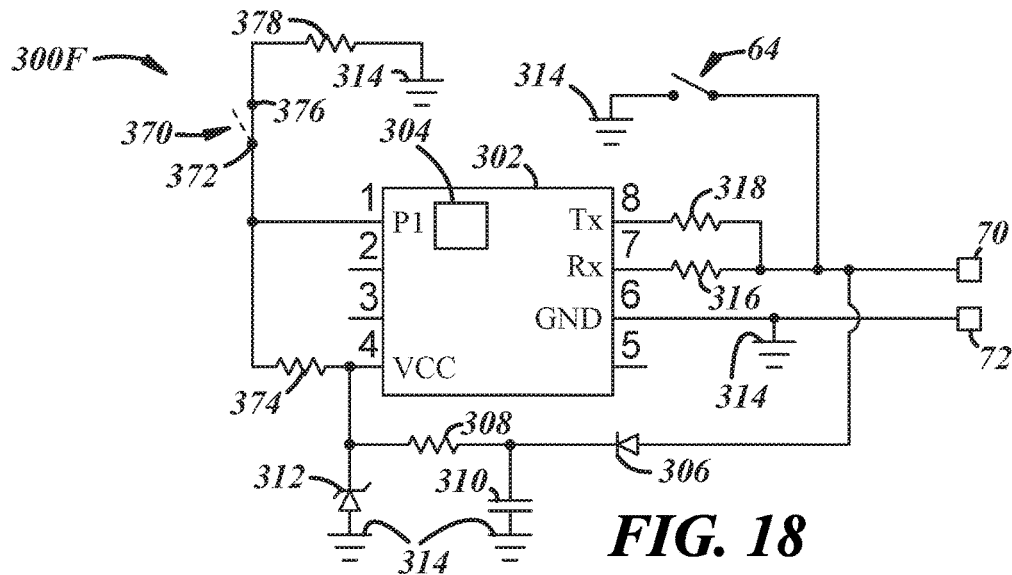
FIG. 18 is a schematic diagram with a signal switch function of the kill switch assembly.

FIG. 18 illustrates a circuit 300F which is the same as circuit 300B except that a signal switch 370 manually actuatable by an operator has been added to cause the microcontroller 302 to send a signal to the engine microcontroller 188 to initiate and execute a process or routine stored in its memory 198. One terminal 312 of the normally closed switch 370, is connected to pin 1 and through a resistor 374 to pin 4 of the microcontroller. The other terminal 376 of the signal switch is connected through a resistor 378 to ground 314, and thus, to terminal 72. When switch 370 is manually opened by the operator it sends a signal to pin 1 which causes the microcontroller 302 to send a start signal to the engine microcontroller 188 to initiate and execute a process or routine such as the air-to-fuel ratio test noted above. Of course it could initiate other processes or routines.

Figure 19:
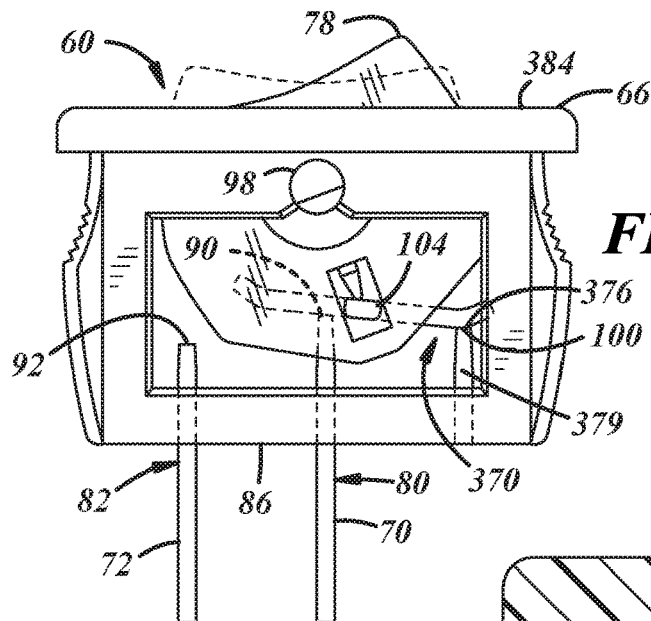
FIG. 19 is an enlarged sectional side view of the kill switch assembly to include a signal switch which is shown in the closed position.
Figure 20:
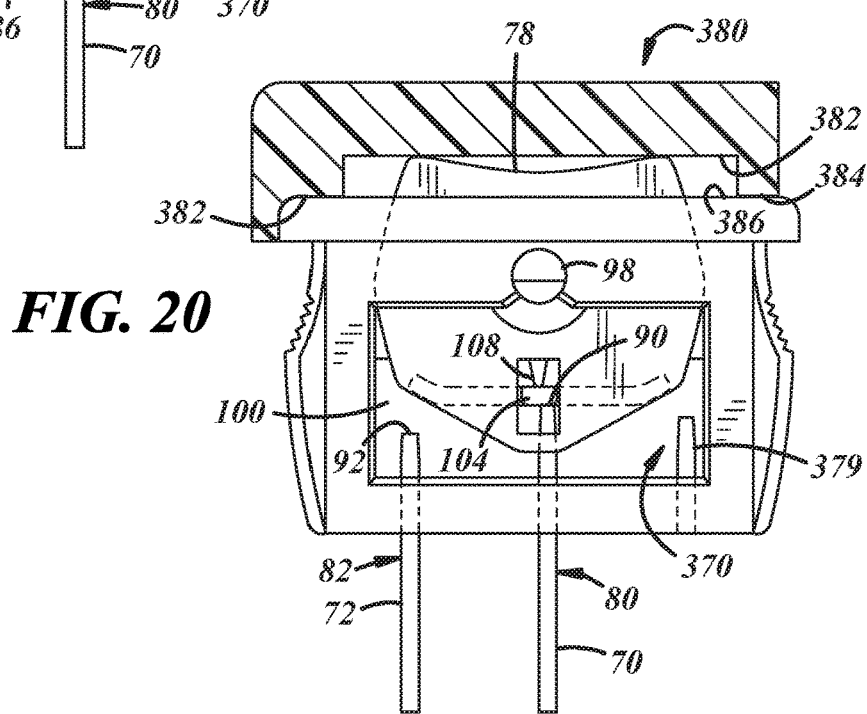
FIG. 20 is an enlarged sectional side view of the kill switch assembly of FIG. 19 with the signal switch releasably retained in an open position by a fixture.

FIGS. 19 and 20 illustrate one form of the signal switch 370 in the kill switch assembly 60 in which a conductor pin 379 is carried by the housing 60 and underlying the connector bar 100 provides the contact 376 and the contact 90 and its terminal 70 also provide the signal switch contact 372. The signal switch 370 is closed when the rocker button 78 is in its normal position to which is it is yieldably placed by a spring 116 as shown in FIG. 19. As shown in FIG. 20 when the rocker button 78 is moved to its middle position it disengages the connector bar 100 from the pin 379 and thereby opens the signal switch 370. A special fixture or tool 380 with a recess 386 can be disposed over the rocker button with its stop surface 384 bearing on the face 386 of the housing 66 to reliably move the rocker button to its center position and thereby open the switch 370.

Figure 21:
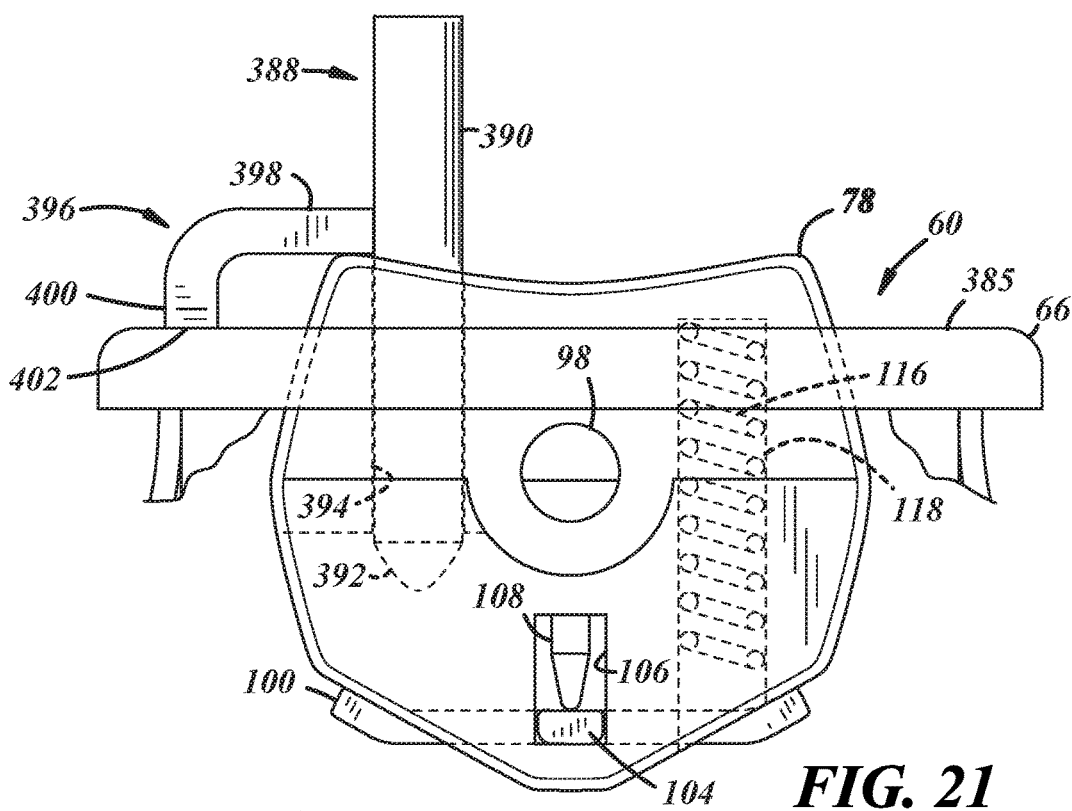
FIG. 21 is an enlarged sectional side view of the kill switch assembly of FIG. 19 with the signal switch releasably retained in an open position by a tool removably received in the rocker button.

FIG. 21 illustrates an alternate tool 388 for moving and positioning the rocker button 78 in its middle position. Tool 388 has a cylindrical shaft 390 with a generally conical tip 392 slidably received in a bore 394 through the rocker button and a generally right angle member 396 with a first leg 398 fixed to and projecting radially outwardly from the shank and bearing on a peripheral edge of the rocker button 78 and a second leg 400 with a free end 402 providing a stop bearing on the outer face 386 of the housing 66.

Figure 22:
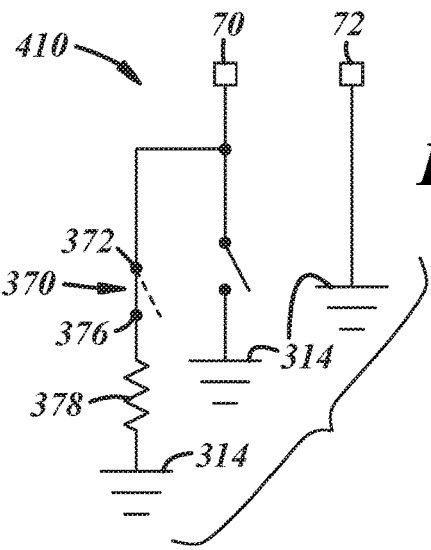
FIG. 22 is a schematic diagram of an alternative circuit with a signal switch of the kill switch assembly.
Figure 23:
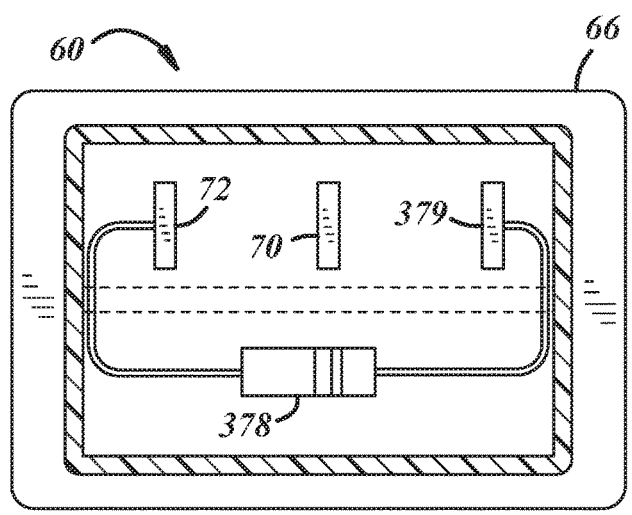
FIG. 23 is a bottom view with a portion broken away of the kill switch assembly of FIG. 22.

FIG. 22 illustrates an alternative circuit 410 in which the signal switch 370 is manually operable by the operator to send a start signal to the microcontroller 302 to cause it to send a start or control signal to the engine microcontroller 188 to start and execute a routine or process stored in it and its memory. The contact 372 of signal switch 370 is connected to terminal 70 and the contact 376 is connected through resistor 378 to ground 314. Thus, as shown in FIG. 23 the resistor 23 is connected to terminal 72 and conductor pin 379 in the housing 66 of the kill switch assembly 60.

Figure 24:
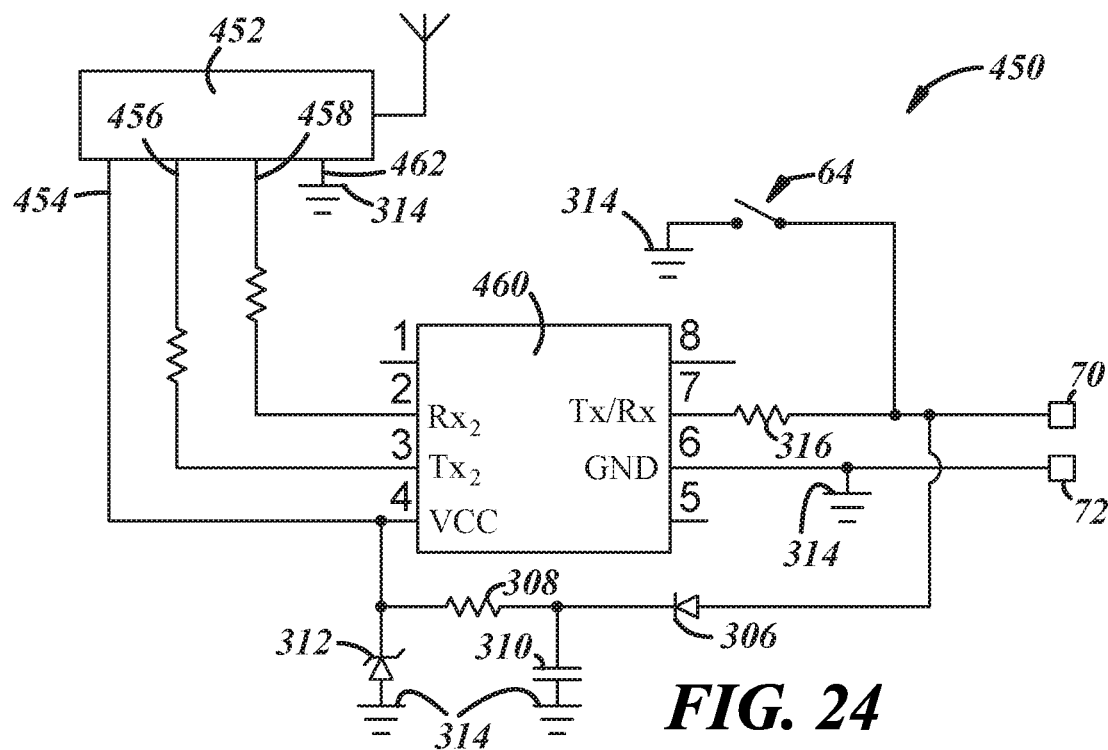
FIG. 24 is a schematic diagram of a circuit including a kill switch and a wireless transmitter and/or receiver.
Figure 25:
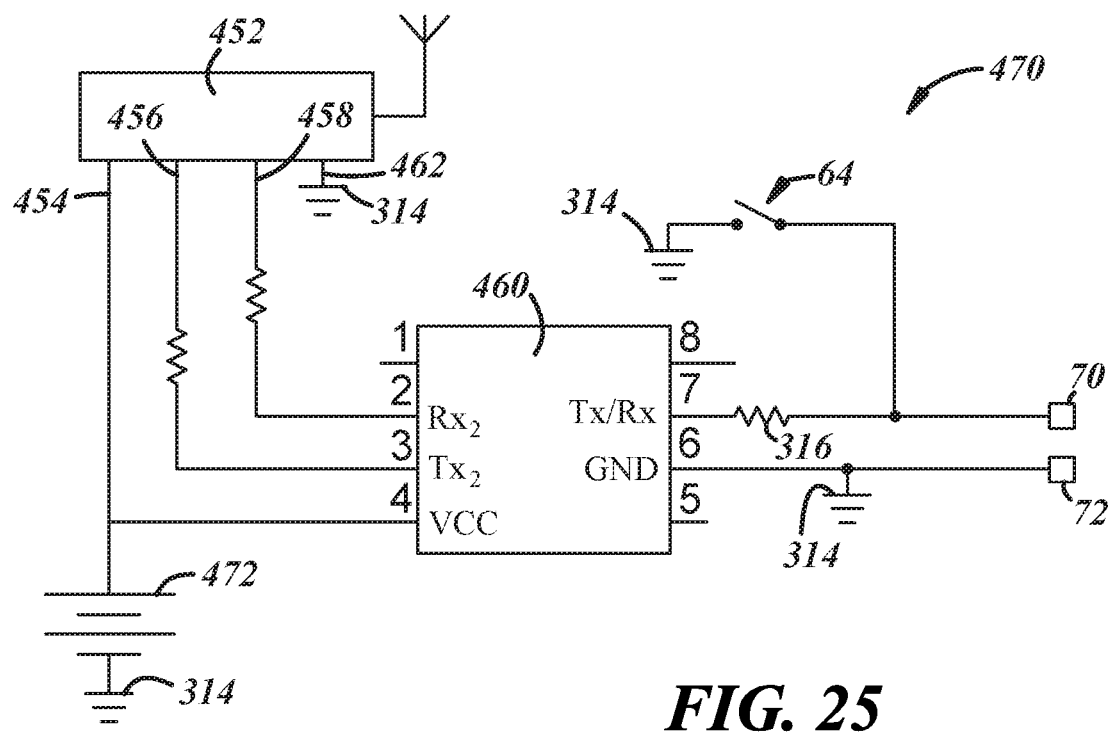
FIG. 25 is a schematic diagram of circuitry like that of FIG. 24 powered by a battery of the kill switch assembly.

The functions and features of the kill switch circuitry may also be transmitted wirelessly, received wirelessly or both, as shown in FIG. 24 which illustrates one example of a control circuit 450 having a wireless module 452. In the example shown the wireless module 452 is a transceiver that utilizes the Bluetooth standard, although any suitable wireless protocol or standard may be used. The transceiver 452 has power 454, transmitter 456 and receiver 458 connections, respectively, to the microcontroller 460 and a ground connection 462. The remainder of the circuit 450 may be as set forth in and described with reference to the circuit 300A of FIG. 10, or otherwise arranged as desired and similar reference numerals denote similar components for ease of description. Engine operating data, control logic for the microcontroller 460 and other features and functions that could be done via a wired connection may thus be communicated wirelessly between the circuit 450 and a device external to the tool, such as a computer, smartphone, tablet, engine diagnostic tool, or the like. In addition, the wireless transmission of a signal from the circuit 450 may permit additional functions, such as providing a location of the tool including the circuit to, for example, facilitate finding a lost or stolen device. FIG. 25 illustrates a similar circuit 470 that includes a battery 472 to power the circuit 470 and so does not need power supply components 306, 308, 310 or 312, but otherwise may be the same as the circuit of FIG. 24 and similar reference numbers have been used to denote similar components for ease of description. The battery 472 may permit communication with the wireless module 452 or microcontroller 460 even when the engine is not operating and power is not supplied from the magneto-capacitive circuit as noted herein.

Providing the wireless communication module near the kill switch 64 or as part of the kill switch assembly may improve the operation of the device, at least in applications wherein the kill switch is located remotely from and not on or immediately adjacent to the engine and/or flywheel which may create EMF interference that makes detection of transmitted signals more difficult. For example, in the application of a weed trimmer or lawn edger, the kill switch may be provided on a handle that is spaced 6 inches or more from the engine or flywheel. Locations closer to the engine may also be used, but signal detection may be more difficult because of interference associated with such locations.

Figure 26:
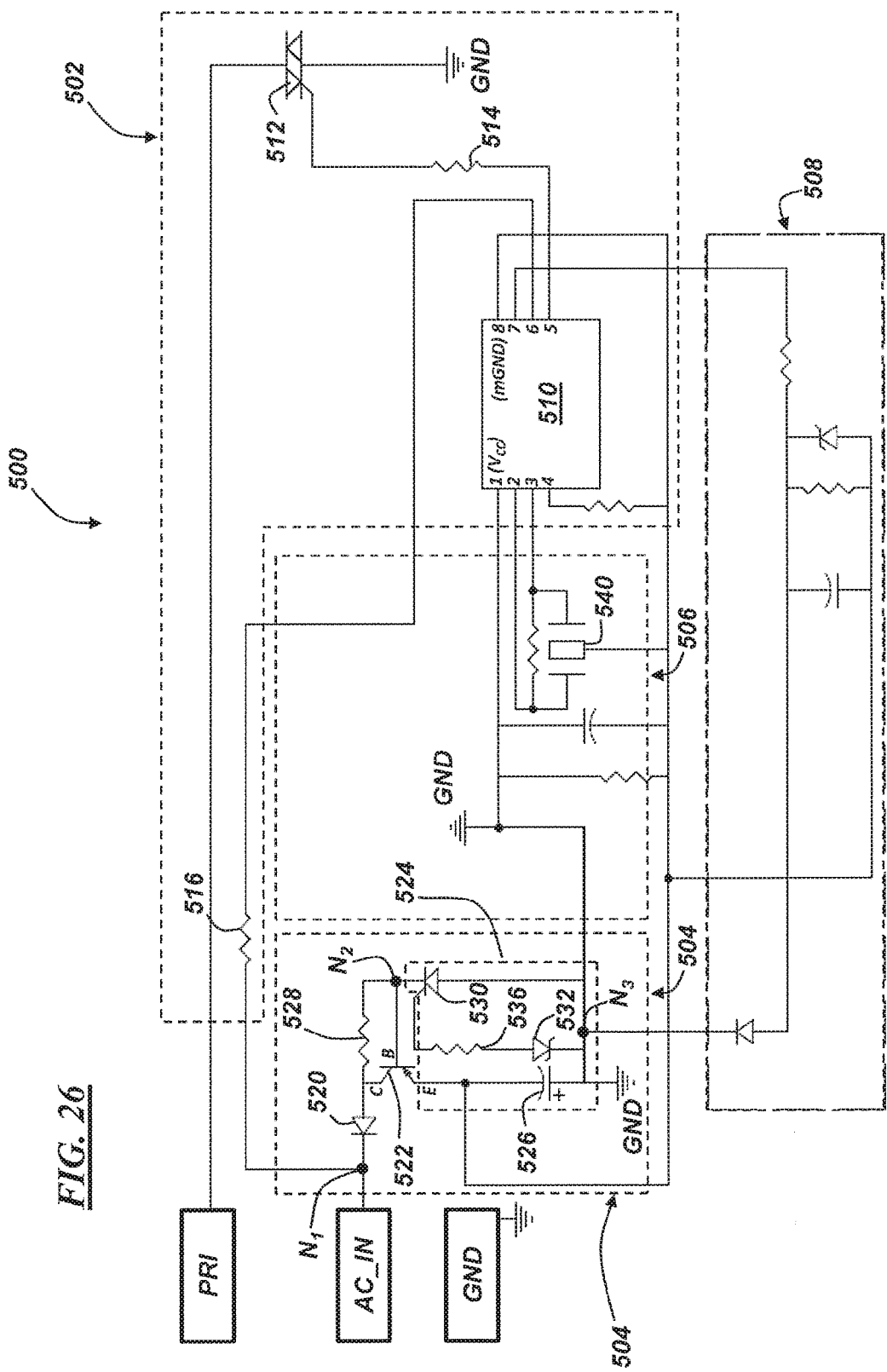
FIG. 26 is a schematic diagram of circuitry for limiting engine speed.

A control circuit 500 of FIG. 26 may be used to limit engine speed, such as by preventing delivery of a spark, or other ignition initiating event from an ignition member, to prevent combustion for one or more engine cycles. This may be done, for example, to prevent an engine from exceeding a maximum speed, which may vary depending upon the application, the use of the engine, ambient temperature or any other desired factor. The circuit 500 may include a speed regulating circuit 502 (for limiting the engine speed), a power circuit 504 (for powering a microprocessor 510 while protecting the microprocessor from overvoltage scenarios), a clock circuit 506 (for synchronizing the microprocessor 510 to the engine speed), and a programming circuit 508 (for programming a microcontroller 510—e.g., for programmable RPM rates and the like).

The speed regulating circuit 502 is configured to selectively prevent energy at the primary coil (PRI) from being discharged which in turn would otherwise create a spark at the ignition member (e.g. a spark plug). In the current embodiment, the speed regulating circuit 502 includes the microprocessor 510 coupled at pin 5 to an input gate of a bidirectional or bilateral triode thyristor 512 (sometimes called a TRIAC) via a resistor 514. The anodes of the TRIAC are coupled to the primary coil (PRI) and to system ground (GND), respectively. Thus, when the microprocessor 510 selectively actuates or triggers the input gate of the TRIAC 512, energy received at the TRIAC from the primary coil PRI is driven to ground GND, thereby inhibiting sparking at the spark plug and consequently slowing the engine speed. Later, the microprocessor 510 may selectively actuate higher engine speed by ceasing to actuate or trigger the TRIAC gate; consequently, primary coil energy PRI will not be driven to ground GND, the spark plug will fire again, and the engine speed will increase.

In the present implementation, the microprocessor 510 also receives data associated with the speed of the engine via pin 6—pin 6 being coupled to AC_IN (or node $N_1$) via resistor 516. Using the voltage (or current) received at pin 6 and a known value of resistor 516, the microprocessor 510 is configured to calculate current engine speed. Thus, when the engine speed exceeds a desired maximum threshold, the microprocessor 510 selectively may trigger the TRIAC 512 to dump power to ground GND. Likewise, when the microprocessor 510 determines the engine speed has fallen below a desired minimum threshold, the microprocessor 510 may cease triggering the TRIAC 512 so that the TRIAC no longer drains power to GND.

In at least one embodiment, the power circuit 504 includes a diode 520, a transistor 522 (e.g., a PNP transistor having emitter E, collector C, and base B), and a protection circuit 524. The emitter E is coupled to both pin 8 (or mGND) of the microprocessor 510 and a capacitor 526 (which in turn is coupled to node $N_3$ or ground GND). In this circuit embodiment, pin 8 (mGND) may be some negative voltage (e.g., approximately −4V), while pin 1 ($V_{CC}$ or GND) may be approximately 0V.

The collector C is coupled between a resistor 528 and an anode of diode 520—a cathode of the diode 520 being coupled to node $N_1$. Base B (node $N_2$) is coupled to an opposite end of resistor 528 and also a cathode of a thyristor 530 of circuit 524. In operation, current may flow through the emitter E and base B (and ultimately diode 520) during negative portions of the AC signal—e.g., drawn through diode 520 by the AC signal. And in general, capacitor 526 becomes charged by the AC signal and the voltage of capacitor 526 serves as the input voltage to pin 8 of the microprocessor 510. Consequently, the microprocessor 510 may be configured to thereby provide a negative voltage trigger signal to the TRIAC 512. A negative trigger at the TRIAC may enable the TRIAC to pass through to ground GND both positive and negation portions of the AC voltage received at the primary coil PRI; if the TRIAC 512 were triggered by a positive voltage, then, in some implementations, both positive and negative portions of the AC voltage might not be shorted.

Protection circuit 524 includes the thyristor 530, a zener diode 532, and the capacitor 526. A cathode of the zener diode 532 is coupled to ground GND (or node $N_3$), whereas an anode thereof is coupled to an input gate of the thyristor 530 (via a resistor 536) so that when the voltage across zener diode 532 exceeds the so-called breakdown voltage or threshold, the thyristor 530 is triggered. In operation, when the charge on the capacitor 526 exceeds the breakdown threshold (e.g., about −4V), then the thyristor 530 is triggered and current can flow through the thyristor 530 (anode to cathode), thereby inhibiting further charge on capacitor 526. During this time, the charge of capacitor 526 may not charge, but may drain—e.g. powering the microprocessor 510 until the voltage of capacitor 526 is less than the breakdown voltage, at which time the thyristor 530 once again may inhibit current flow (anode to cathode)—e.g., the thyristor 530 may be a "gate turn-off" or GTO thyristor. Thus, the power circuit 504 provides power to the microprocessor 510, and the protection circuit 524 prevents the microprocessor 510 from a potentially damaging overvoltage scenario.

The clock circuit 506 includes an external oscillator 540 coupled to the microprocessor 510 at pins 2, 3 and 8 for improved clocking to aid in detecting engine speed, although this arrangement is optional and may be omitted (see for example FIG. 27 discussed below).

The programming circuit 508 is configured to tune the microprocessor 510 to operate with a different desired engine speed. For example, currently the microprocessor 510 will trigger the TRIAC 512 at a predetermined engine speed; however, in some embodiments a different predetermined engine speed may be desired instead. Thus, circuit 508 enables programmability of the engine speed used to trigger the TRIAC 512. The programming circuit 508 is optional and also may be omitted.

As discussed above, the microcontroller 510 may provide a negative voltage to the gate of the TRIAC 512 when it is desired to prevent a spark event which prevents a combustion event within the engine and has the effect of reducing engine power and speed. The microcontroller 510 may monitor engine speed as a function of AC_IN signal generated by magnets associated with the engine flywheel. When an engine speed above a threshold is determined, the output may be provided to the TRIAC gate to short the primary coil PRI and pass energy therein to ground, and this is accomplished without a battery and without a relay which can be expensive and not reliable over time. The engine speed may be limited in this way for any desired reason, including prevention of damage to the engine or otherwise. The primary coil PRI may be grounded in this way for all or any at least some engine cycles (e.g. every 1 out of 3 cycles or the like) until the engine speed is at or below the threshold speed, or until some other engine speed is attained, as desired.

Figure 27:
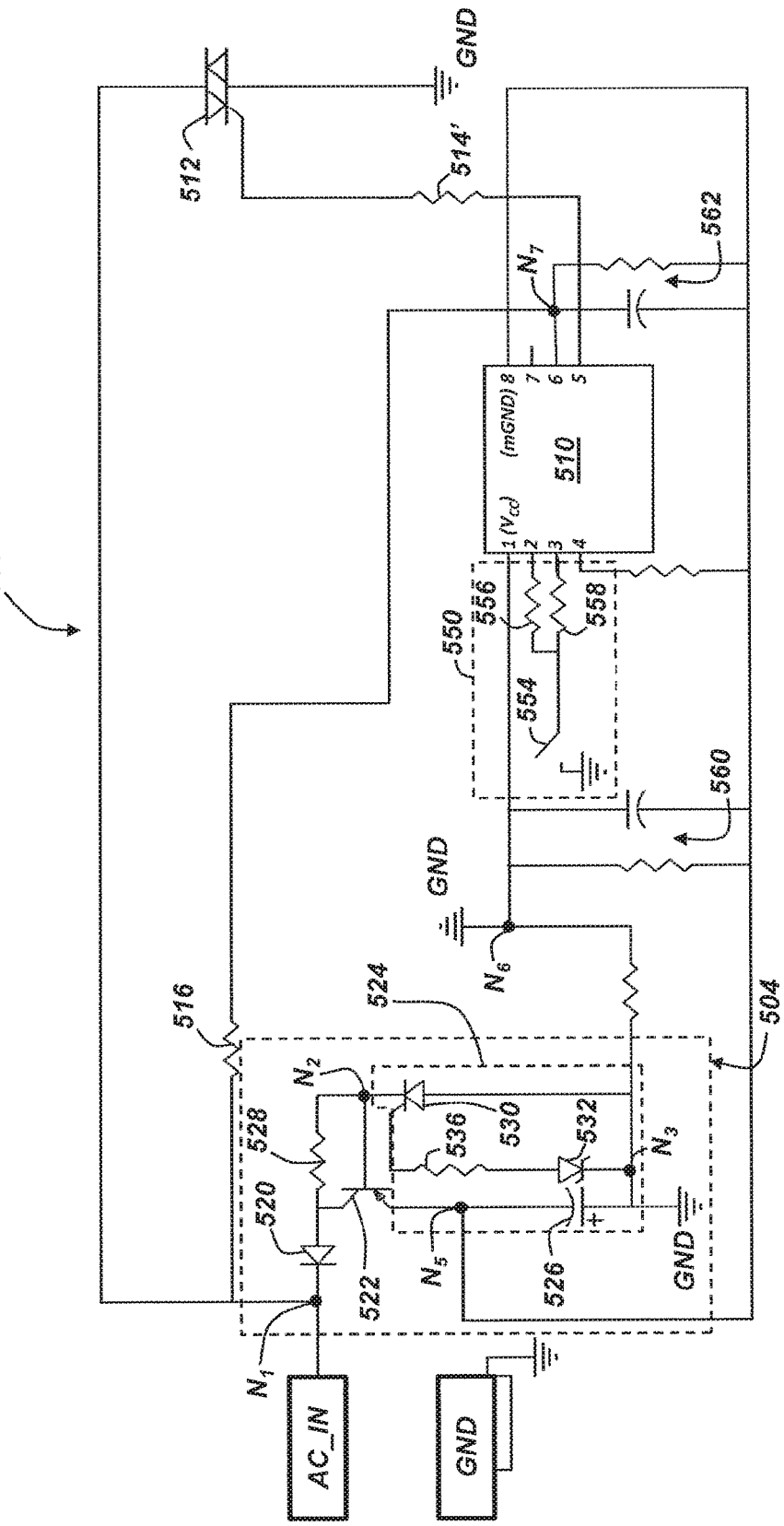
FIG. 27 is a schematic diagram of circuitry for limiting engine speed and including a kill switch.

FIG. 27 illustrates another embodiment of the circuit shown in FIG. 26; however, circuit 500' in FIG. 27 includes, among other things, a kill switch circuit 550. As described below, when the kill switch circuit 550 is activated, further ignition events are prevented so that the engine will cease operating. More particularly, circuit 550 includes an actuatable switch 554 coupled to ground GND and two resistors 556, 558, wherein resistor 556 is coupled to pin 2 of microprocessor 510 and resistor 558 is coupled to pin 3 thereof. The resistors 556, 558 may be arranged as a voltage divider so that when switch 554 is closed, the voltage at pin 2 or pin 3 indicates a power OFF condition at the microprocessor 510, and consequently, the microprocessor 510 actuates the TRIAC 512 at pin 5 (via resistor 514').

As illustrated in FIG. 27, the TRIAC 512 in circuit 500' is coupled directly to the AC_IN via node $N_1$ (e.g., instead of the primary coil PRI, as it was in FIG. 26). Thus, when the microprocessor 510 triggers or actuates the TRIAC 512, the TRIAC drives the AC_IN to ground GND (e.g., instead of driving the primary coil PRI to ground). In some implementations, it may be desirable to trigger TRIAC 512 intermittently—e.g., in order ensure the microprocessor 510 remains powered until the AC_IN voltage drops to zero. For example, it may be desirable to provide some power to the power circuit 504 while the crankshaft slows down. It should be appreciated that if the TRIAC 512 is driven to ground GND without intermittent triggering, all current by-passes circuit 504; therefore, the microprocessor 510 may become unpowered once capacitor 526 rises above a predetermined threshold (recall: microprocessor 510 is powered by a negative voltage). Thus, by intermittently triggering TRIAC 512, the power circuit 504 may continue to charge and microprocessor 510 may be sufficiently powered to control the TRIAC 512 until the ignition circuit ceases to generate power and the engine is unpowered or 'killed.' Of course, once the AC_IN also drops below a predetermined voltage, the power circuit 504 also will have insufficient power to keep the microprocessor 510 powered on, and consequently, the microprocessor 510 will power OFF as well.

Circuit 500' may include additional features as well. For example, circuits 560, 562 are adapted to provide filtering characteristics to improve operation of the microprocessor 510 (e.g., smoothing the AC signal, minimizing undesirable noise, etc.). For example, circuit 560 includes a resistor and capacitor arranged in parallel between node $N_5$ (which powers the microprocessor at pin 8) and node $N_6$ (e.g., pin 1 ($V_{CC}$) or GND). Similarly, circuit 562 includes a resistor and capacitor arranged in parallel between node $N_5$ and node $N_7$ (which is coupled to pin 6 of the microprocessor 510 and also node $N_1$ (via resistor 516)). These filtering circuits may or may not be required in all embodiments.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A kill switch assembly for an internal combustion engine with an engine microcontroller comprising:
   a housing;
   a first terminal carried by the housing and configured for connection to a ground and a second terminal carried by the housing and configured for connection to the engine microcontroller;
   an electric kill switch carried by the housing, electrically connected to the first and second terminals, and manually operable by an operator to change the state of the electric kill switch to provide an engine stop signal to the engine microcontroller; and
   an electronic circuit carried by the housing, connected to the first and second terminals, and communicating with the engine microcontroller, wherein the electronic circuit comprises a signal switch carried by the housing, connected to the second terminal and through a resistor to the first terminal and manually operable by the operator to send a start signal to the engine microcontroller to start a routine or process executed by the engine microcontroller.

2. The assembly of claim 1 wherein the electronic circuit comprises an electronic circuit microcontroller carried by the housing, operably connected to the first and second terminals and configured to receive current and/or historical performance data via the engine microcontroller.

3. The assembly of claim 1 wherein the electronic circuit comprises an electronic circuit microcontroller carried by the housing and having a plurality of pins with one pin connected through a resistor to the second terminal to receive data from the engine microcontroller and another pin connected through a resistor to the second terminal to transmit data to the engine microcontroller.

4. The assembly of claim 1 wherein the electronic circuit comprises an electronic circuit microcontroller carried by the housing and having at least two pins; and
   a data terminal carried by the housing and connected by a first resistor to one of the pins of the microcontroller to receive data from the engine microcontroller.

5. The assembly of claim 4 further comprising the data terminal connected through a second resistor to a second pin of the electronic circuit microcontroller to transmit data received through the data terminal to the engine microcontroller.

6. The assembly of claim 1 wherein the electronic circuit comprises an electronic circuit microcontroller carried by the housing and having at least first and second pins;
   the first pin connected through a resistor to the second terminal;
   and a light emitting diode carried by the housing, connected to the second pin and visually observable by the operator to provide the operator with a visual indication of something occurring or that has occurred in the engine microcontroller or in the operation of the engine.

7. The assembly of claim 1 wherein the electronic circuit comprises an electronic circuit microcontroller carried by the housing and having at least a first pin and a second pin;
   the first pin connected through a resistor to the second terminal;
   and a temperature sensor connected to the first pin to provide to the engine microcontroller an indication of the ambient temperature of the atmosphere in which the engine is operating.

8. The assembly of claim 1 wherein the electronic circuit comprises an electronic circuit microcontroller carried by the housing and having a first pin; and
   a terminal carried by the housing, connected to the first pin for supplying power to the electronic circuit microcontroller and configured to be connected to a battery to supply power to the electronic circuit microcontroller.

9. The assembly of claim 1 wherein the electronic circuit comprises an electronic circuit microcontroller carried by the housing and having a first pin for supplying electric power to the electronic circuit microcontroller and a diode and a resistor in series connecting the second terminal to the first pin to supply power to the engine microcontroller.

10. The assembly of claim 1 wherein the electronic circuit comprises an electronic circuit microcontroller having at least first, second, third, and fourth pins;
    a first pin connected through a resistor to the second terminal;
    and a computer connector carried by the housing and configured for connection to a personal computer and having a first terminal connected to a second pin to supply current from the computer to the electronic circuit microcontroller to power the electronic circuit microcontroller;
    a second terminal connected through a resistor to a third pin of the electronic circuit microcontroller for the computer to receive data from the electronic circuit microcontroller; and
    a third terminal connected through a resistor to the fourth pin for transmitting data from the computer to the electronic circuit microcontroller.

11. The assembly of claim 10 wherein the computer connector comprises a fourth terminal connected to a ground pin of the electronic circuit microcontroller.

12. The assembly of claim 1 further comprising a connector carried by the housing, accessible from the exterior of the housing and providing a connection with the first and second terminals of the housing when a complementary electrical connector is connected thereto.

13. The assembly of claim 1 which also includes a transceiver and wherein the communication with the engine microcontroller occurs wirelessly via the transceiver.

14. The assembly of claim 13 wherein the transceiver is located adjacent to the kill switch.

15. A kill switch assembly for an internal combustion engine with an engine microcontroller comprising:
- a housing;
- a first terminal carried by the housing and configured for connection to a ground and a second terminal carried by the housing and configured for connection to the engine microcontroller;
- an electric kill switch carried by the housing, electrically connected to the first and second terminals, and manually operable by an operator to change the state of the electric kill switch to provide an engine stop signal to the engine microcontroller; and
- an electronic circuit carried by the housing, connected to the first and second terminals, and communicating with the engine microcontroller, wherein the electronic circuit comprises an electronic circuit microcontroller carried by the housing and having at least first, second, and third pins;
- the first pin connected through a resistor to the second terminal; and
- a data terminal carried by the housing and connected through a resistor to the second pin to receive data from the electronic circuit microcontroller which was transmitted from the engine microcontroller through the first pin to the electronic circuit microcontroller.

16. The assembly of claim 15 wherein the data terminal is connected through a second resistor to the third pin to transmit data to the electronic circuit microcontroller for transmission to the engine microcontroller.

17. A kill switch assembly for an internal combustion engine with an engine microcontroller comprising:
- a housing;
- a first terminal carried by the housing and configured for connection to a ground and a second terminal carried by the housing and configured for connection to the engine microcontroller;
- an electric kill switch carried by the housing, electrically connected to the first and second terminals, and manually operable by an operator to change the state of the electric kill switch to provide an engine stop signal to the engine microcontroller; and
- an electronic circuit carried by the housing, connected to the first and second terminals, and communicating with the engine microcontroller wherein the electronic circuit comprises an electronic circuit microcontroller carried by the housing and having at least first and second pins;
- the first pin connected through a resistor to the second terminal; and
- a signal switch carried by the housing, connected to the second pin of the electronic circuit microcontroller and to a ground pin of the engine microcontroller and manually operable by an operator to change the state of the signal switch to send through the electronic circuit microcontroller a start signal to the engine microcontroller to cause the engine microcontroller to start a process executed in the engine microcontroller.

18. The assembly of claim 17 wherein the start signal causes the engine microcontroller to initiate and execute an air-to-fuel ratio test process.

\* \* \* \* \*